(12) United States Patent
Isono et al.

(10) Patent No.: US 7,050,678 B1
(45) Date of Patent: May 23, 2006

(54) OPTICAL MODULE, OPTICAL ELEMENT ATTACHMENT METHOD, AND RECEPTACLE-FITTED OPTICAL MODULE

(75) Inventors: Yoshiya Isono, Sakura (JP); Tsutomu Watanabe, Sakura (JP); Makoto Ohsawa, Sakura (JP); Koji Tanaka, Sakura (JP); Takehisa Ide, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 09/786,248

(22) PCT Filed: Aug. 27, 1999

(86) PCT No.: PCT/JP99/04630

§ 371 (c)(1),
(2), (4) Date: Jun. 4, 2001

(87) PCT Pub. No.: WO00/13053

PCT Pub. Date: Mar. 9, 2000

(30) Foreign Application Priority Data

| Aug. 28, 1998 | (JP) | .................. 10-243038 |
|---|---|---|
| Nov. 25, 1998 | (JP) | .................. 10-334807 |
| Aug. 24, 1999 | (JP) | .................. 11-237630 |
| Aug. 24, 1999 | (JP) | .................. 11-237631 |
| Aug. 24, 1999 | (JP) | .................. 11-237632 |
| Aug. 25, 1999 | (JP) | .................. 11-237805 |
| Aug. 25, 1999 | (JP) | .................. 11-237806 |

(51) Int. Cl.
*G02B 6/42* (2006.01)
(52) U.S. Cl. .................. 385/39; 385/15; 385/31
(58) Field of Classification Search .................. 385/42, 385/55, 62, 81, 85, 87, 88, 15, 31, 38, 39, 385/50, 51, 52
See application file for complete search history.

(56) References Cited

U.S. PATENT DOCUMENTS

| 4,803,361 | A | * | 2/1989 | Aiki et al. ............. 250/227.24 |
|---|---|---|---|---|
| 4,913,511 | A | * | 4/1990 | Tabalba et al. ............... 385/88 |
| 4,987,164 | A | * | 1/1991 | Kauffman et al. .......... 524/413 |
| 5,047,835 | A | * | 9/1991 | Chang ........................ 257/433 |
| 5,285,512 | A | * | 2/1994 | Duncan et al. ............... 385/94 |
| 5,719,978 | A |   | 2/1998 | Kakii et al. |
| 6,118,915 | A | * | 9/2000 | Sato ............................ 385/39 |
| 6,236,787 | B1 | * | 5/2001 | Laughlin .................... 385/52 |
| 6,480,639 | B1 | * | 11/2002 | Hashimoto et al. .......... 385/14 |

FOREIGN PATENT DOCUMENTS

| CN | 1106985 | 8/1995 |
|---|---|---|
| EP | 437 931 | 7/1991 |
| EP | 645 651 | 3/1995 |

(Continued)

*Primary Examiner*—Drew A. Dunn
*Assistant Examiner*—Joshua L Pritchett
(74) *Attorney, Agent, or Firm*—Bell, Boyd & Lloyd LLC

(57) ABSTRACT

A passive method is provided as alignment means for aligning an optical fiber with an optical element in assembling an optical module, while increasing alignment accuracy. A mount (28a) equipped with an optical element (3a) is positioned by abutment on a face (33c) of a projection (33a) formed inside a package (33) and on a side (33g) of a positioning pad (37) projecting from the bottom (33f) of the package. A mount (28b) equipped with an optical element (3b) is positioned by abutment on an inner wall (33b) of the package and on a face (33i) of a projection (33c) formed inside the package. Since the optical power of received or emitted light need not be monitored for fine adjustments of alignment, this method is less expensive.

13 Claims, 26 Drawing Sheets

FOREIGN PATENT DOCUMENTS

| | | |
|---|---|---|
| EP | 895 112 | 2/1999 |
| JP | 4-119304 | 4/1992 |
| JP | 7-209556 | 8/1995 |
| JP | 10-206698 | 8/1998 |
| WO | WO94/23318 | 10/1994 |
| WO | WO98/32042 | 7/1998 |

* cited by examiner

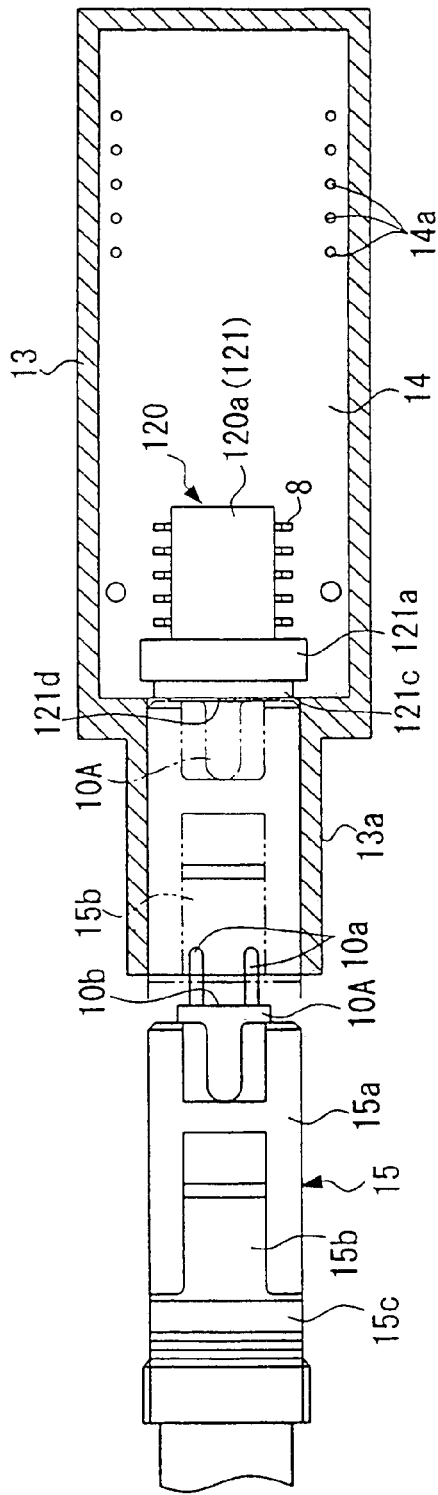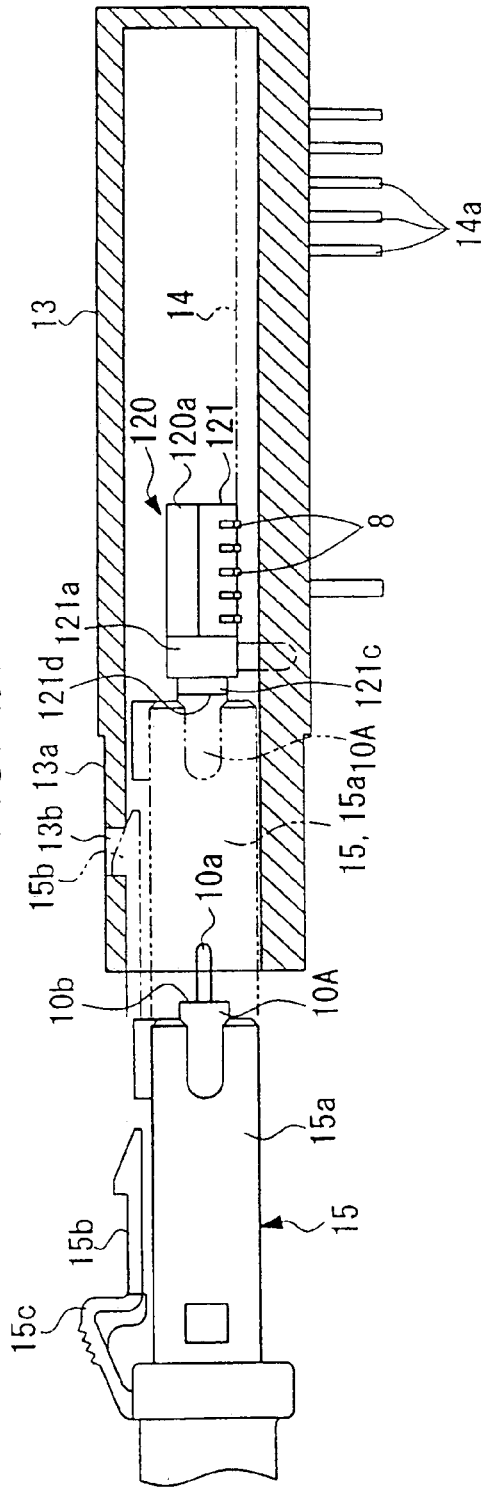

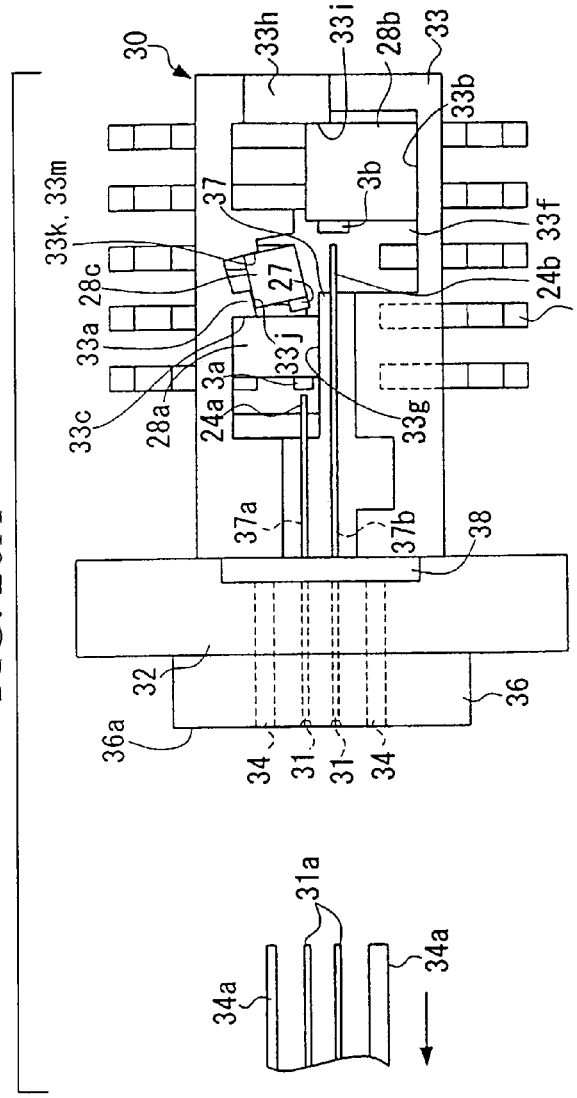

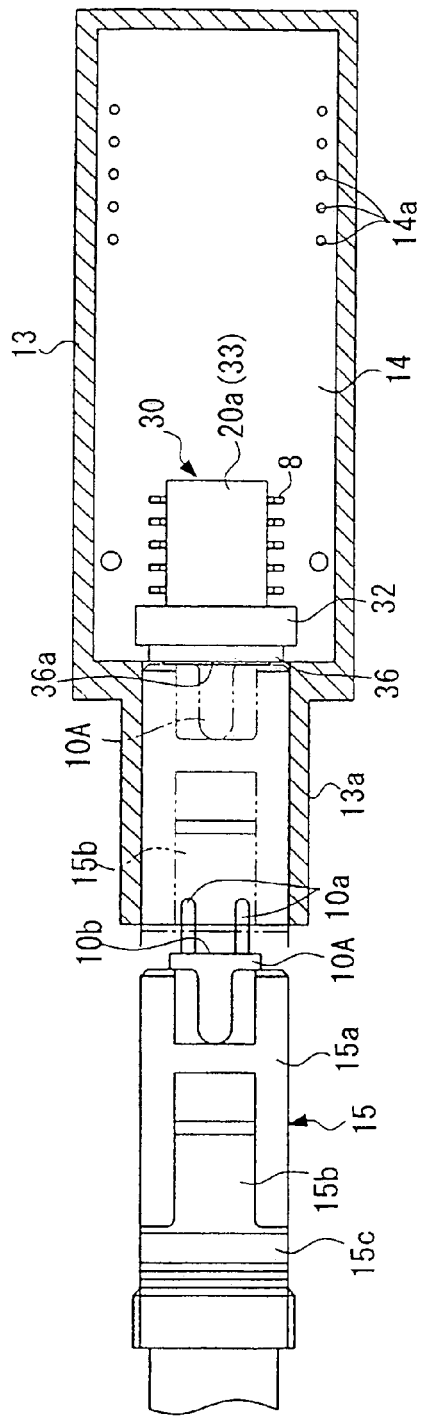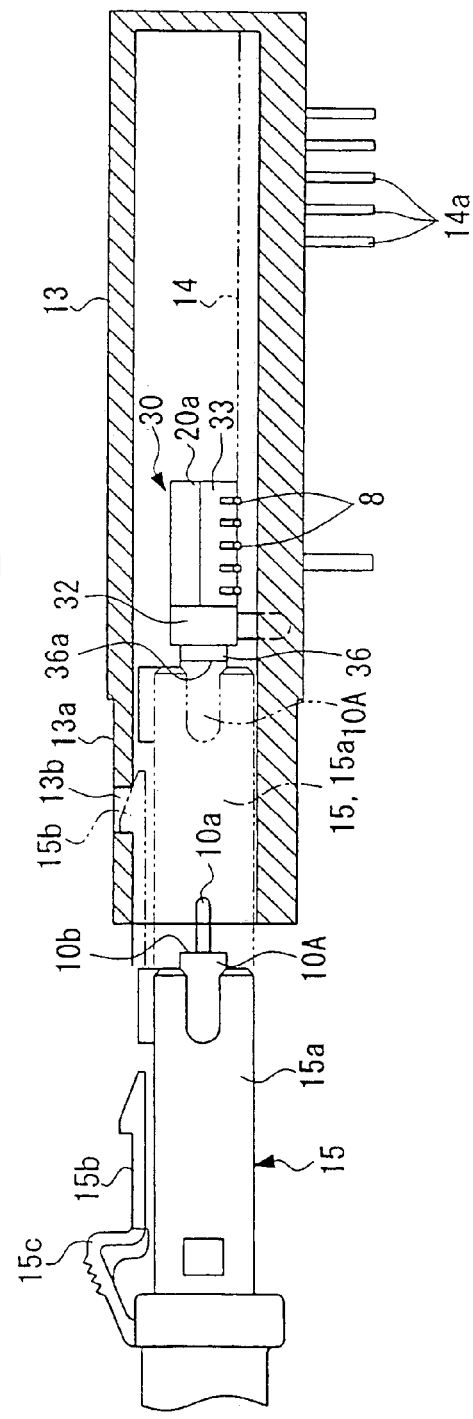

OPTICAL MODULE, OPTICAL ELEMENT ATTACHMENT METHOD, AND RECEPTACLE-FITTED OPTICAL MODULE

TECHNICAL BACKGROUND

This invention relates to an optical module, which is an optical-electrical converting component between an optical fiber and an electronic circuit, for example, an optical module mounted in a transceiver and the like for a LAN system such as a G-bit ethernet, an optical element attachment method, and a receptacle-fitted optical module.

An optical module is an optical-electrical converting component wherein optical elements such as an LD (for example, using a face light-emitting-type semiconductor laser) and a PD (photodiode) are mounted on a lead frame, and these are sealed in a resin package (package for optical module). Usually, the optical module is connected to external optical wires by a single-filament or multi-filament optical connector section, attached to the package side face. For example, an SC-type ferrule corresponding to an SC connector is often used as the single-filament optical connector section which is attached to the package side face, and an MT(mechanically transferable)-type ferrule corresponding to a two-filament MT connector is often used as the multi-filament optical connector section.

The MT connector is an optical connector comprising optical fibers which are inserted and secured in a ferrule forming a joint face, and is thereby pin-fitted in position. Since the MT connector is stipulated by Japanese Industrial Standards JIS (plastic multi-filament optical fiber connector, JIS C5981), it will not be explained in detail.

FIG. 36 is a plan view of an example of a conventional optical module 1 when the cap is removed. Reference numeral 2 represents a package for optical module, 3 represents optical elements (3a showing the LD, and 3b showing the PD), 4 represents a mount which the optical elements 3 are mounted on, 5 represents an optical connector section comprising a ferrule, 6 represents optical fibers which are inserted into the ferrule 5 and secured therein, 7 represents lead terminals, and 8 represents an external optical connector which is attached to the tip of an optical fiber 9.

In the same way as a two-filament MT connector, the ferrule 5 shown in the diagram can be positioned by a pin-coupling method, thereby butt-connecting the optical fibers. Two optical fibers 6 are inserted and secured in the ferrule 5, and extend straight into the package 2 as a result of their own rigidity. When assembling the optical module 1 using this two-filament MT-type optical ferrule 5, the extending sections 6a of said two optical fibers 6 must be position-centered (axis-aligned) with the light-receiving face and light-emitting face of the optical elements 3 in order to achieve optimum effectiveness. Incidentally, since the optical fibers 6 cannot actually be moved, position-centering is carried out by adjusting the position of the optical element side.

There are two types of method for correctly aligning the tips of the optical fibers 6, which have been inserted and secured in the ferrule 5, with the optical element, as follows:

(1) Make the distance between the optical elements 3 and the side face which faces to the inside of the package 2 of the ferrule 5 as short as possible, and align and connect the tips of the optical fibers 6 to the optical elements 3. In this case, after positioning has been completed, the tips of the optical fibers 6 are affixed to the optical elements 3 by using an adhesive.

(2) Provide a positioning stand for positioning the optical fibers 6 in the correct positions between the ferrule 5 and the optical elements 3.

The positioning stand usually comprises two straight V-grooves, the extending sections 6a of the optical fibers 6 which extend from the ferrule 5 being secured on the positioning stand and positioned in a predetermined position and a predetermined direction.

The abovementioned positioning methods (1) and (2) have merits and demerits. In the case of (i), although the number of connection points is small, it is not possible to provide a sufficient gap between the ferrule 5 and the optical elements 3, and consequently there are problems that there is little freedom of design and adjustment is difficult.

For this reason, the method of (2), which provides a positioning stand fitted with V-grooves, is generally employed. The ferrule need not be fitted afterwards, but can be molded (the lower half of the ferrule) simultaneous to molding the package. In this case, there is an aspect in which, when the ferrule section is provided so as to extend to the inside, and the positioning stand fitted with V-grooves and the ferrule become a single unit, the positioning stand need not be molded as a separate body but can be directly connected.

There are two methods, termed active alignment and passive alignment, to carry out positioning between the optical fibers 6 and a semiconductor element. According to the active method, while emitting and receiving light by using an optical element, the optical power is monitored by using a gauge so that the optical power input/output efficiency with the optical fibers becomes an optimum value, and the position of the optical element is minutely adjusted. Marks and the like for positioning are provided on the optical element. These marks are monitored by a TV camera and the like while minutely adjusting the position of the optical element so as to match the marks showing the appropriate position inside the package. The passive method is a method for structural positioning.

In the active method, the adjustment is made while measuring the optical power. Therefore, an expensive special-purpose position-adjusting apparatus is required, with consequent drawbacks that time and labor are consumed.

In the passive method, adjustment is easy but precision is circumspect.

DISCLOSURE OF THE INVENTION

It is an object of this invention to provide an optical module which has a simple constitution, and uses, as a means for relatively positioning optical fibers and optical elements when assembling the optical module, a passive method which does not require an expensive special-purpose position adjusting apparatus, position marking and the like, and can be positioned with sufficiently high precision, an optical element attachment method, and a receptacle-fitted optical module.

That is, in a package comprising a plurality of optical elements and an optical connector section for connecting to an outside optical connector, tips of optical fibers which are insertedly secured to said optical connector section, are aligned facing a light-emitting face and a light-receiving face of said optical elements, the optical module of this invention is characterized in that said package has a positioning structure comprising walls and the like for directly contacting said optical elements, or mounts which the optical elements are mounted on, whereby this positioning structure ensures that said optical elements or the optical elements mounted on said mount are positioned in predetermined positions with respect to the tips of said optical fibers, which are insertedly secured to said optical connector and protrude to the inside of said package. The positioning structure comprises protrusions for positioning, which protrude inwardly from inner walls of the package, concavities, and the inner wall face themselves, the optical elements themselves and the mount being positioned by directly contacting these. The protrusions for positioning, the concavities, the inner walls, and the like, are obtained by members for positioning and the like which have been molded in a single body by metal cast molding and the like of a package comprising for example plastic and the like, positioned precisely, and inserted so as to be made in a single body (this includes single body molding).

According to the optical module of this invention, the positioning of the optical fibers and the optical elements when assembling the optical module is performed by the passive method, and therefore, unlike the active method, in which the optical elements are minutely moved while measuring the optical power of the light-emitting and light-receiving optical elements, the mount which the optical elements are mounted on need only be provided so as to touch predetermined points (such as protrusions for positioning and key-shaped corners) on the package, and consequently positioning is extremely simple. Furthermore, there is no need for an expensive special-purpose position adjustment apparatus. Furthermore, unlike the conventional passive method, there is no need for positioning marking, and positioning can be achieved with adequately high precision. Therefore, the manufacturing cost of the optical module can be greatly reduced.

In the optical module according to this invention, by connecting to an optical connector, the optical fibers on this optical connector side are optically connected via the optical fibers mounted on the package (optical fibers which pass through the optical connector section) to the optical elements. Ends of the optical fibers mounted on the package are optically coupled (a relationship which makes it possible to radiated light from the optical elements, and receive light transmitted from the optical elements) to the optical elements mounted in the package, and other ends thereof are positioned so that they can be butt-connected to the optical connector on the package side wall. Therefore, when the optical connector is connected to the package side, and the optical fibers of the optical connector side and the optical fibers mounted in the package are connected, the optical fibers of the optical connector side are optically coupled to the optical elements via the optical fibers mounted in the package. Here, to achieve the aim of optically coupling (not necessarily limited to a coupling for maximizing the optical input/output power efficiency) the optical connector side optical fibers to the optical elements, there are the problems of (a) maintaining a precise relative positional relationship between the optical elements and the optical fibers mounted in the package, and (b) maintaining the positioning precision which will enable the optical fibers mounted in the package to be butt-connected to the optical fibers of the optical connector side. By maintaining the precision in (a) and (b), the desired optical coupling can be achieved.

The former (a) precision is maintained by, for example, positioning means comprising a positioning stand having positioning grooves which position the optical fibers in the package, and optical fiber insertion holes (see a third embodiment described later) provided through the optical connector section comprising the package side wall. The positioning grooves and the optical fiber insertion holes are provided in the package, and the positioning structure which positions the mounts and the optical elements themselves mentioned above are similarly provided in the package. Therefore, the (a) precision is achieved by maintaining the positioning precision between the positioning grooves and optical fiber insertion holes, and the positioning grooves for the optical elements, in the package. Accordingly, in this invention, positioning precision between the positioning grooves and optical fiber insertion holes, and the positions (also including optical element positions determined by the positioning of the mounts) of the optical elements which are positioned by the positioning structure, are maintained at high precision by single-body molding of the package. In particular, super precision can easily be obtained by molding the positioning grooves and the positioning structure in a single body. Consequently, accurate position centering is obtained between the optical fibers, which are positioned by the positioning grooves and the optical fiber insertion holes, and the optical elements, which are positioned by the positioning structure, thereby achieving the precision of (a).

The latter (b) precision can, for example, easily be obtained by positioning by means of a pin coupling method between the optical connector section provided in the package. In particular, this precision can be easily obtained by using a pin coupling method between fitting pin holes linearly provided in the package side wall as the optical connector section and the optical connector. Here, the fitting pins should preferably be those applied in an MT-type optical connector as stipulated by Japan Industrial Standard JIS C 5981 (International Electrical Commission 1754-5). By using fitting pins which protrude to the optical connector insertedly fitted into fitting pin holes (also including fitting pin holes which have been provided in an optical connector section, which is separately incorporated in the package) provided in the package side, superior positioning precision can be obtained.

In the pin coupling method which uses fitting pins, a highly precise parallel should preferably be maintained between the axis-centering by using the positioning grooves and optical fiber insertion holes for obtaining the precision of (a), and the axis-centering of the fitting pin holes on the package side. This point in a package which is made in a single body comprising the fitting pin holes, the molding cast direction of the positioning grooves for achieving the precision of (a) becomes exactly perpendicular to the fitting pin holes. Since the optical fiber insertion holes for achieving the precision of (a) are formed by molding casts in the same direction (or the same molding casts) as the fitting pin holes, a highly precise parallel can more easily be achieved by combining the optical fiber insertion holes and the fitting pins, rather than combining positioning grooves and fitting pins which have been formed by using separate metal casts in separate directions. It has been discovered that, in a combination of the optical fiber insertion holes and the fitting pins, sufficient positioning precision can be achieved even when single mode optical fibers having a core diameter of approximately several μm are butt-connected.

An optical element attachment method of this invention makes it easy to mount optical elements in a package in the optical module of this invention, and particularly including an electrically connection between electrodes on the mount side and lead terminals on the package side.

The receptacle-fitted optical module comprises a receptacle for positioning an external optical connector incorporated in the optical module according to this invention, and can easily and reliably achieve positioning securing between the receptacle and the optical module.

BRIEF DESCRIPTION OF THE DRAWINGS

FIG. 6 is a perspective view seen from the bottom face side of the optical element-fitted mount in FIG. 2 and the like.

FIG. 19A is a plan cross-sectional view of the state when the optical module of FIGS. 15A to 15C is incorporated in a receptacle, and FIG. 19B is a front cross-sectional view of the same.

FIG. 20A is a plan view of the optical module according to the second embodiment of this invention, FIG. 20B is a front view of the same, and FIG. 20C is a view from the arrow B of FIG. 20B.

FIG. 24A is a plan cross-sectional view of the optical module of FIG. 20A when incorporated in a receptacle, and FIG. 24B is a frontal cross-sectional view of the same.

BEST MODES FOR REALIZING THE INVENTION

First Embodiment

Next, a first embodiment of this invention will be explained.

Figure 1:
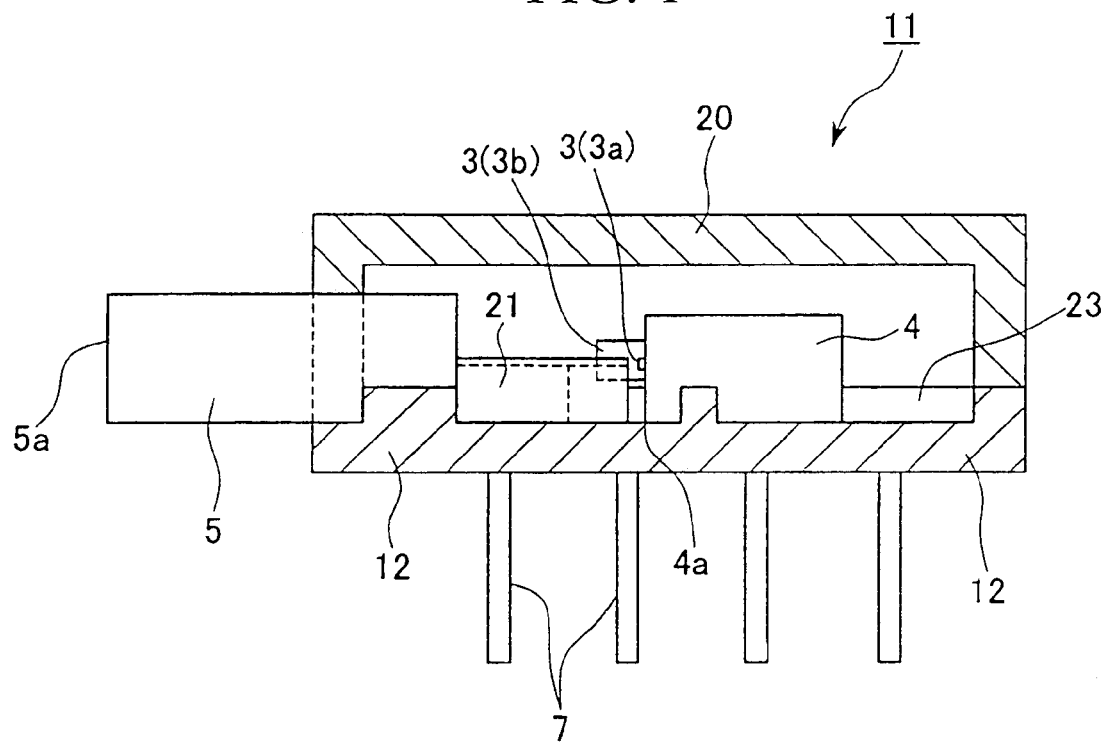
FIG. 1 is a cross-sectional view of an optical module according to an embodiment of this invention.
Figure 2:
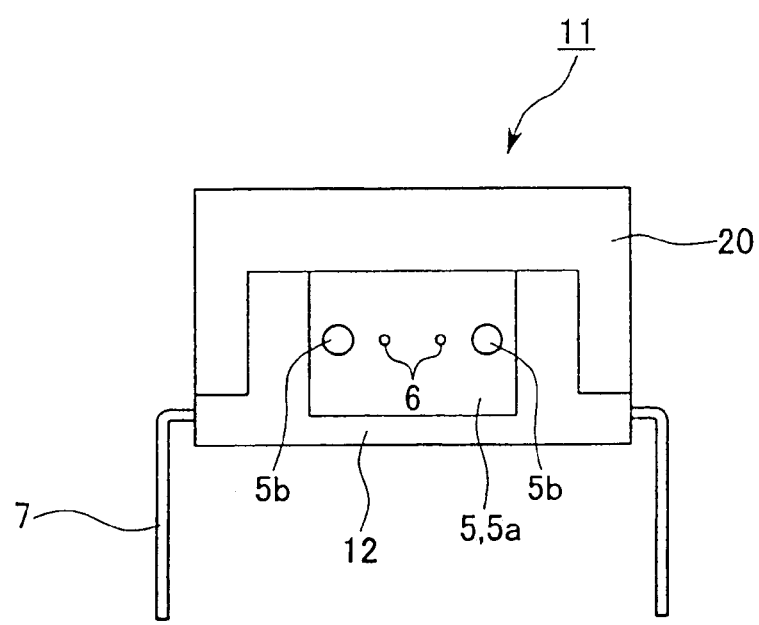
FIG. 2 is a left-side view of FIG. 1.
Figure 3:
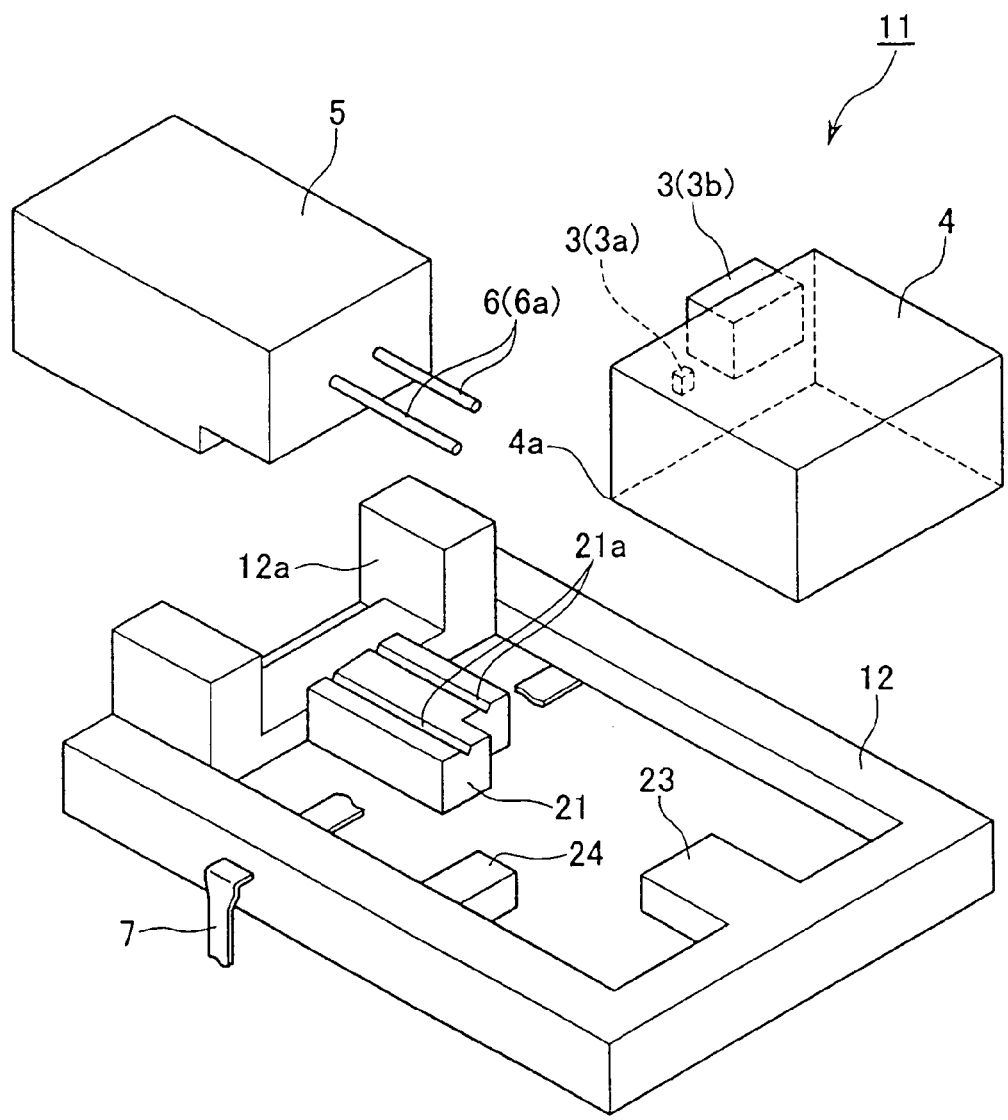
FIG. 3 is an exploded perspective view of the optical module of FIG. 1 without a cap.
Figure 4:
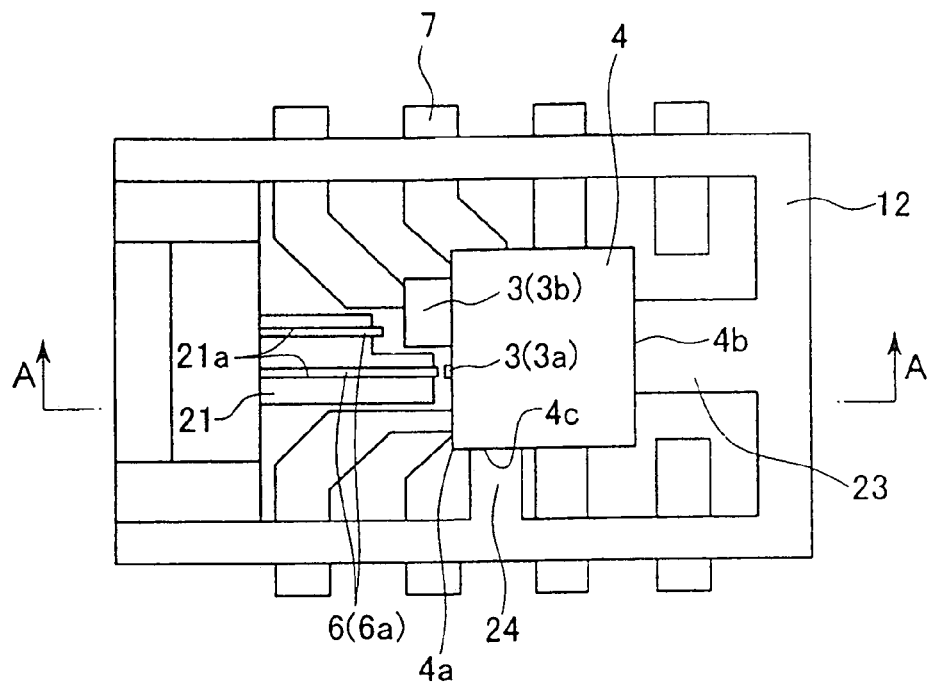
FIG. 4 is a plan view of a package in the optical module of FIG. 1.

FIG. 1 is a cross-sectional view of an optical module 11 according to an embodiment of this invention, FIG. 2 is a left-side view of FIG. 1, FIG. 3 is an exploded perspective view of the optical module 11 of FIG. 1 without a cap, and FIG. 4 is a plan view of a package for optical module (hereinafter termed simply "package") 12 in the optical module 11 of FIG. 1. As shown in these diagrams, the optical module 11 comprises a mount 4 of aluminium die casting and the like, which optical elements such as an LD (in particular, one using a face light-emitting-type semiconductor laser) 3*a* and a PD (photodiode) 3*b* are mounted on. The mount 4 is provided in a resin package 12. A ferrule 5 has a constitution resembling a two-filament MT connector, and is attached to the front section of the package 12 as an optical connector section and sealed with a cap 20.

Figure 36:
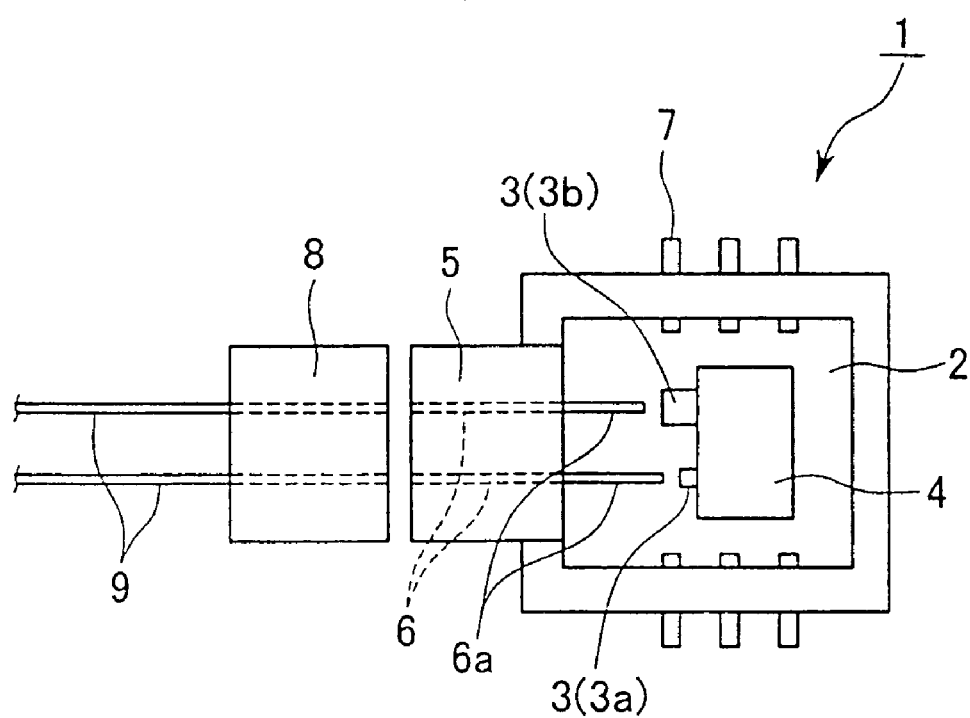
FIG. 36 is a plan view of a conventional optical module.

Said ferrule 5 generally has a box-type outer shape achieved by cutting away the brim section of an MT connector. The optical fiber 6 is inserted, only the necessary length thereof being extended to the inside, and secured in this state by using adhesive. Originally, the brim section of the MT connector is needed for, for example, an MPO-type optical connector (MPO: multifiber push on), comprising a plastic optical connector which is stipulated by JIS C 5982 (corresponding to IEC 1754-7), as a mechanical positioning section, or as a clip-receiving section for clip-joining. However, when incorporated in an optical module, this section is required only when it is to be used as a positioning element. That is, the ferrule 5 is positioned between the package 12 and an external optical connector (e.g. the optical connector 8 shown in FIG. 36) by fitting pins, which are inserted into fitting pin holes 5*b* on either side of a join end face 5*a* shown in FIG. 2, and the join end face of the external optical connector abuts to the join end face 5*a*. The optical fiber, which is exposed at the join end face of the external optical connector, is precisely positioned with respect to the optical fiber exposed in the center section of the join end face 5*a*, and connected thereto. Incidentally, the fitting pin holes 5*b* are provided extending from the join end face 5*a* into the ferrule 5, but are excluded from FIG. 3 and the like.

A concavity 12*a* is provided in one part of the side wall of the package 12, to allow the ferrule 5 to be fitted. The ferrule 5 is fitted into the concavity 12*a* and affixed therein. Thus, the ferrule 5 is provided as the optical connector section of the optical module 11.

Incidentally, there is another method of manufacturing a ferrule in which the ferrule is molded simultaneously with the package. In this case, the lower half of the ferrule, particularly the optical fiber holes (actually grooves), and the positioning pin holes (actually grooves) on either side thereof, are provided simultaneously. Thereafter, the optical fibers are placed in the grooves, coated with adhesive, and stipulated with a lid.

In this embodiment of this invention, positioning structures such as a positioning stand 21 having positioning grooves 21*a* for position-holding the extending sections 6*a* of the optical fibers 6 which are securely inserted into the ferrule 5, and square two-directional protruding sections for positioning 23 and 24 for positioning the mount 4 which the optical elements 3 are mounted on, are molded together with said package 12. Grooves having a function of position-adjusting optical fibers, such as V-grooves, U-grooves, and round-grooves, are used for the positioning grooves 21*a*. In FIG. 3 and the like, V-grooves are used.

A material which can be precisely molded should preferably be used as the material of the mount 4 and the package 12.

For example, an alumina ceramic (sintered body), an aluminium nitride sintered body, a liquid crystal polymer, and the like, is used as the material of the mount 4. An alumina ceramic (sintered body) and an aluminium nitride sintered body have superior heat radiation, making them particularly suitable as material for a mount for mounting the light emitting element 3*a*. A liquid crystal polymer has superior temperature characteristics and is inexpensive, making it suitable as material for a mount for mounting both the light emitting and light receiving elements 3*a* and 3*b*. The mount material is also common to the other embodiments.

Epoxy resin and the like is used as the material of the package 12.

Said extending sections 6*a* of the two optical fibers 6 which extend from the ferrule toward the inside are placed in and supported by the two positioning grooves 21*a* of said positioning stand 21. As already explained, the positioning stand 21 is molded together with the package 12 when molding the package 12, and consequently has a constitution wherein the bottom section of the package 12 is protuberant.

Subsequently, the procedure whereby the optical elements 3 are minutely moved to carry out positioning of the optical fibers 6 and the optical element 3 will be explained.

The two optical elements 3 (the PD 3*b* and LD 3*a*) on the mount 4 are each placed at stipulated positions by using, for example, the corner 4*a* of the lower face of the mount 4 as a reference. A wiring pattern (not shown in the diagram) is provided on the top face of the mount 4 and is electrically connected to the optical elements 3. The bottom side of this wiring pattern is soldered to a lead frame (not shown) on the bottom face of the mount 4. The top side of the wiring pattern is soldered to the optical elements 3. Furthermore, the tips of the lead frame comprise lead terminals 7, which are exposed at the sides of the package 12.

To position the light-emitting face and light-receiving face of the two optical elements 3, and the optical fibers 6 for light-emitting and light-receiving, in the long direction of the optical fibers (the left-to-right direction in FIG. 4), the protruding section for positioning 23 is molded in a single body so that part of the inner wall face of the rear of the package 12 is protruding. The tip face of this protruding section for positioning 23 directly contacts a side face for positioning 4*b* of the mount 4, whereby the positioning in the long direction of the optical fibers is achieved.

To position the two optical elements 3 in the direction which is at a right angle to the long direction of the optical fibers, the protruding section for positioning 24 is molded in a single body so that part of the inner wall face of the side of the package 12 is protruding. The tip face of this protruding section for positioning 24 directly contacts another side face 4*c* which is at a right angle to said side face for positioning 4*b* of the mount 4, whereby the positioning in the direction at a right angle to the long direction of the optical fibers is achieved. As a result, the state of FIG. 1 is obtained. Incidentally, FIG. 1 corresponds to a cross-sectional view taken along the line A to A of FIG. 4 (FIG. 1 showing the state when a cap 20 is provided).

As described above, since the two optical elements 3 on the mount 4 are provided at accurate positions from the reference position (corner 4*a*), by accurately positioning the mount 4 by using said intersecting two-directional protruding sections for positioning 23 and 24, the two optical elements 3 can be accurately positioned with respect to the package 12. Then, the extending sections 6*a* of the optical fibers 6 extending from the ferrule 5 are contained in the positioning grooves 21*a* of the positioning stand 21 provided with V-grooves which is molded together with the package 12 at an accurate position, positioning them accurately with respect to the package 12. Therefore, the tips of the optical fibers 6 and the light-emitting face and light-receiving face of the optical elements 3 can be accurately positioned.

As described above, in this optical module 11, the positioning of the optical fibers 6 and the optical elements 3 when assembling the optical module 11 is performed by the passive method. Unlike the active method, in which the optical elements are minutely moved while measuring the optical power of the light-emitting and light-receiving optical elements 3, the mount 4 which the optical elements 3 are mounted on need only be provided so as to touch predetermined points (the tip faces of the protruding sections for positioning 23 and 24) on the package 12. Therefore, positioning is extremely simple. Furthermore, there is no need for an expensive special-purpose position-adjusting apparatus. Furthermore, unlike the conventional passive method, there is no need for positioning marking. In addition, positioning can be achieved with adequate precision.

Incidentally, although the protruding sections for positioning of this embodiment extend from inner wall faces of the package, basically they need only be able to position the mount. In view of this, it is only necessary that the directly contacting section (position stipulating section) for positioning is structurally maintained. Therefore, it is not essential for the protruding sections for positioning to extend like shelves from the inner walls of the package as in this embodiment; they may simply protrude from the bottom of the package instead.

Further, when molding the ferrule (optical connector section) simultaneously with the package, which entails molding the ferrule simultaneously to the positioning stand, the positioning stand becomes a single body with the ferrule section and becomes difficult to distinguish therefrom. However, even in such cases, the existence of the positioning stand is recognized.

In positioning the mount 4 according to the passive method mentioned above, the positioning operation can be completed in a shorter time than when positioning by the active method. This reduces the assembly time of the entire optical module, and makes it possible to lower the assembly costs.

Furthermore, the above embodiment describes an optical module having lead terminals which pass through throughholes in a printed substrate, but it can of course be applied in an optical module which is mounted on the surface of the printed substrate. In this case, the bottom sections of the lead terminals are flat, and contact with the wiring pattern on the surface of the printed substrate.

Figure 5:
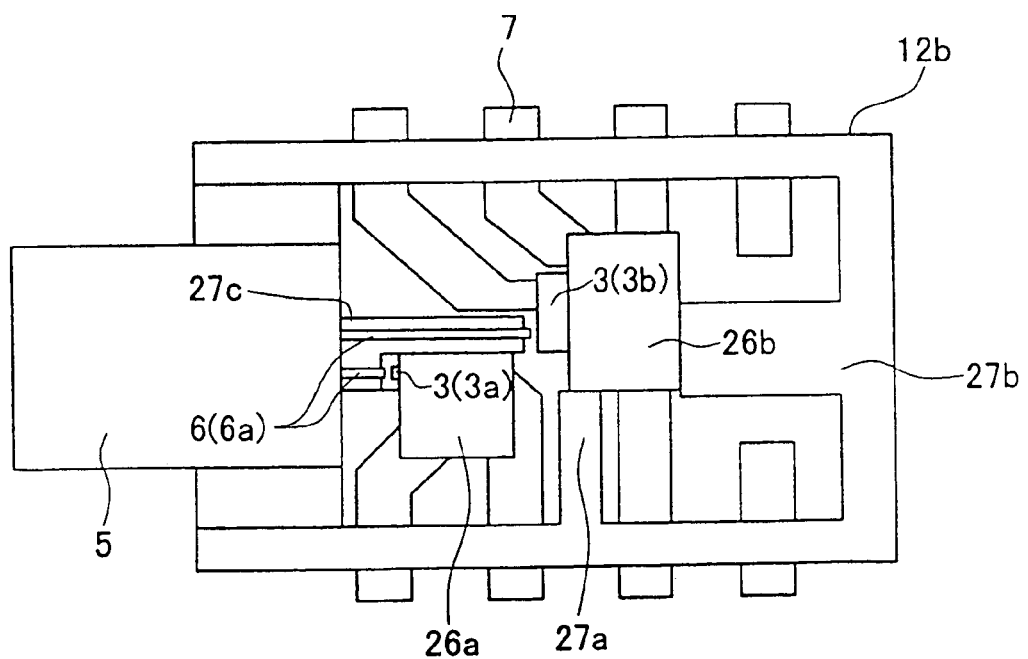
FIG. 5 shows another embodiment of this invention, being a plan view of an optical module comprising two optical elements mounted on separate mounts, without a cap.

The constitution described until now is positioned by mounting the light-emitting and light-receiving optical elements 3a and 3b on a single mount 4, and positioning this mount 4 in the protruding sections for positioning 23 and 24, and so on, but this invention is not limited to this constitution. As shown in FIG. 5, the optical elements 3a and 3b can be mounted on separate mounts 26a and 26b, which are positioned passively by directly contacting protruding sections for positioning 27a and 27b, provided in the package 27 in the same manner as said protruding sections for positioning 23 and 24, and a positioning stand 27c, which performs the same functions as the positioning stand 21.

Figure 12A:
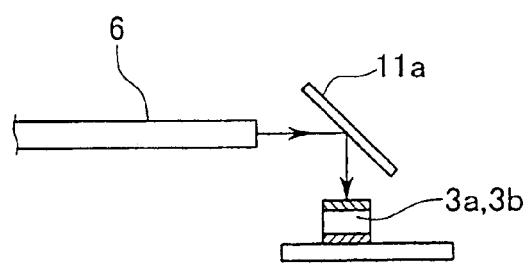
FIG. 12A is a primary part side view showing one example of a structure for leading the optical axis on the optical fiber side to the optical element by using a mirror.
Figure 12B:
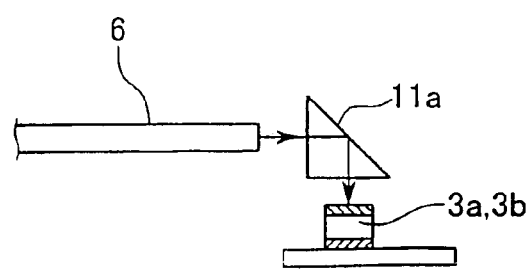
FIG. 12B is a primary part side view showing one example of a structure for leading the optical axis on the optical fiber side to the optical element by using a prism.
Figure 13:
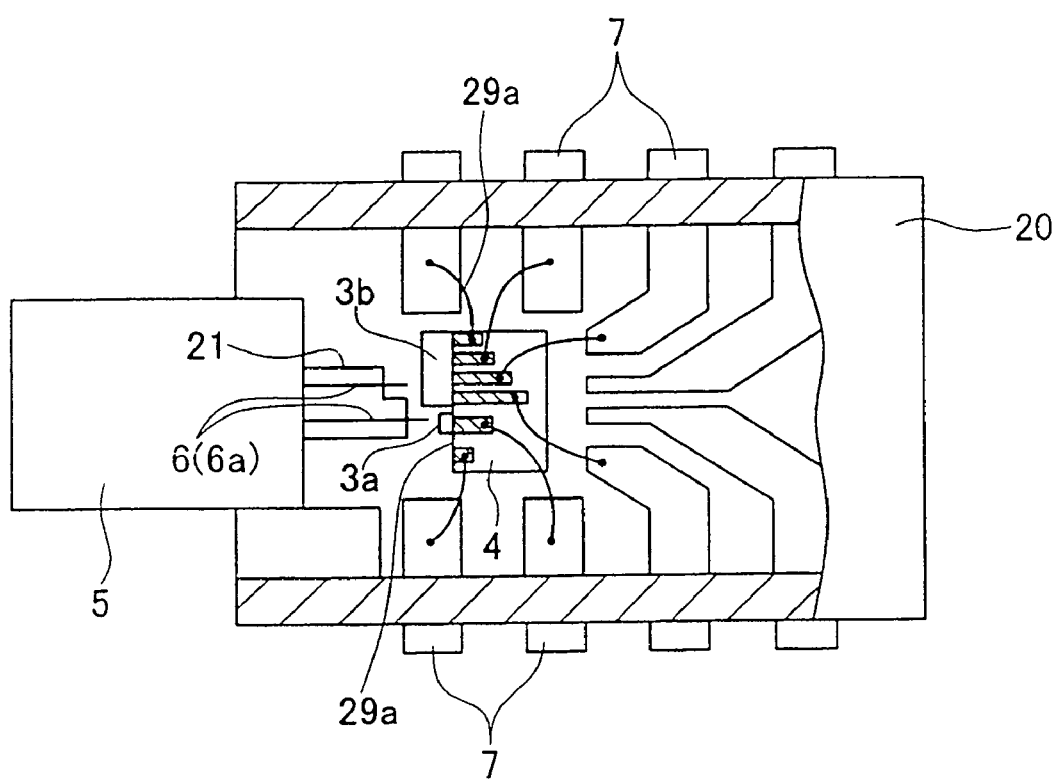
FIG. 13 is a plan view of a mount-side electrode in the optical module which is electrically connected by bonding wire to a lead terminal.
Figure 14:
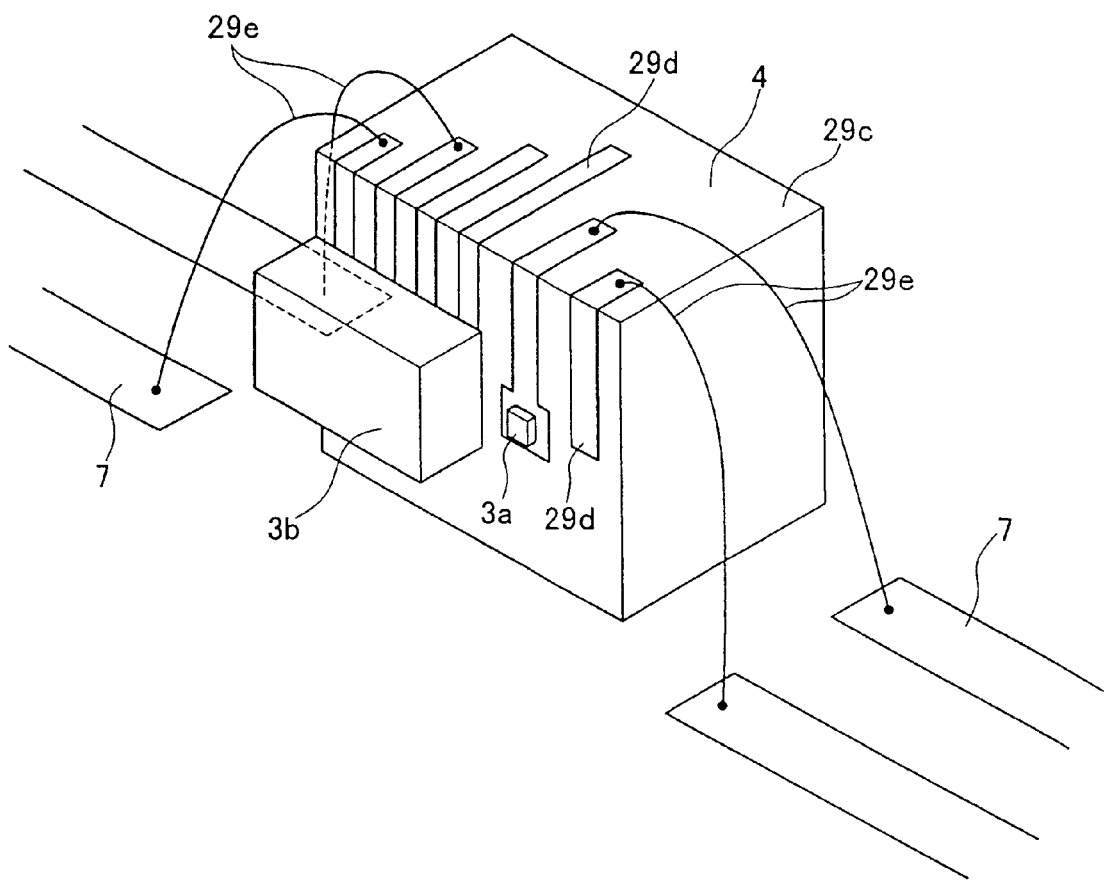
FIG. 14 is a perspective view seen from above the optical element-fitted mount section in the optical module of FIG. 13.

A face light-emitting-type optical element, that is, a face light-emitting laser diode (VCSEL) and a light-emitting diode, or a face light-receiving-type photodiode, and the like are particularly widely used as optical elements of an optical module for multimode optical fibers. The face light-emitting-type optical element comprises a simple electrode face, which is the face at the rear with respect to the front light-emitting and light-receiving faces (the portion when a hole is provided in the electrode face), the structure being provided at the front and rear of the optical fibers. On the other hand, the electrical circuit (electrical wiring substrate) is usually provided parallel to the long direction of the optical fibers. Consequently, when the light-receiving faces of the optical element directly face the optical fibers (intersects with the optical fibers), the electrode faces on the rear face of the optical elements intersect the electrical wiring substrate at a right angle, and therefore require processing for connection. When the electrode faces on the rear faces of the optical elements are directly electrically connected to the electrical wiring substrate of the package, the light-receiving faces of the optical elements no longer faces the optical fiber end faces. In view of this, as shown in FIGS. 12A and 12B, a countermeasure has been considered whereby the optical path along the long direction of the optical fibers 6 is altered by using a mirror 11a or a prism 11b, so that it faces the light-receiving faces of the optical elements 3a and 3b. In this case, the lead terminals of the package and the electrodes of the electrical wiring substrate are connected together by bonding wire. Furthermore, as shown in FIGS. 13 and 14, when the light-emitting faces of the optical elements directly face the optical fibers, a constitution has been considered wherein an electrode 29d is provided on the front face 29a and top face 29c of the mount 4, which the optical elements 3a and 3b are mounted on, and which face said optical fibers. The optical elements are attached to the front face 29c, and said electrode 29d and the lead terminal 7 are connected by a bonding wire 29e.

However, in such a method for directly mounting the optical elements, (1) the constitution is complex. (2) assembly requires much work. (3) the shape of the package is increased by the bonding wire and space. (4) since bonding wire is thin and the passage of electricity is poor, the electrical characteristics become poor. (5) the bonding wire generates and receives electromagnetic waves, making noise likely to enter the electrical signals. In particular, when transmitting and receiving optical signals at high frequencies greater than 1 GHz, characteristics become poor, which is a drawback. (6) in the method where the light-emitting and light-receiving faces of the optical elements are directly opposite the optical fibers, there are cases where the long distance between the lead terminal and the position of the electrode results in longer bonding wire, further worsening the abovementioned electrical characteristics. In view of this, this invention proposes appropriate technology for assembling the mount in the package and attaching the optical elements to the mount. Three aspects will be explained below.

(First Aspect)

Figure 6:
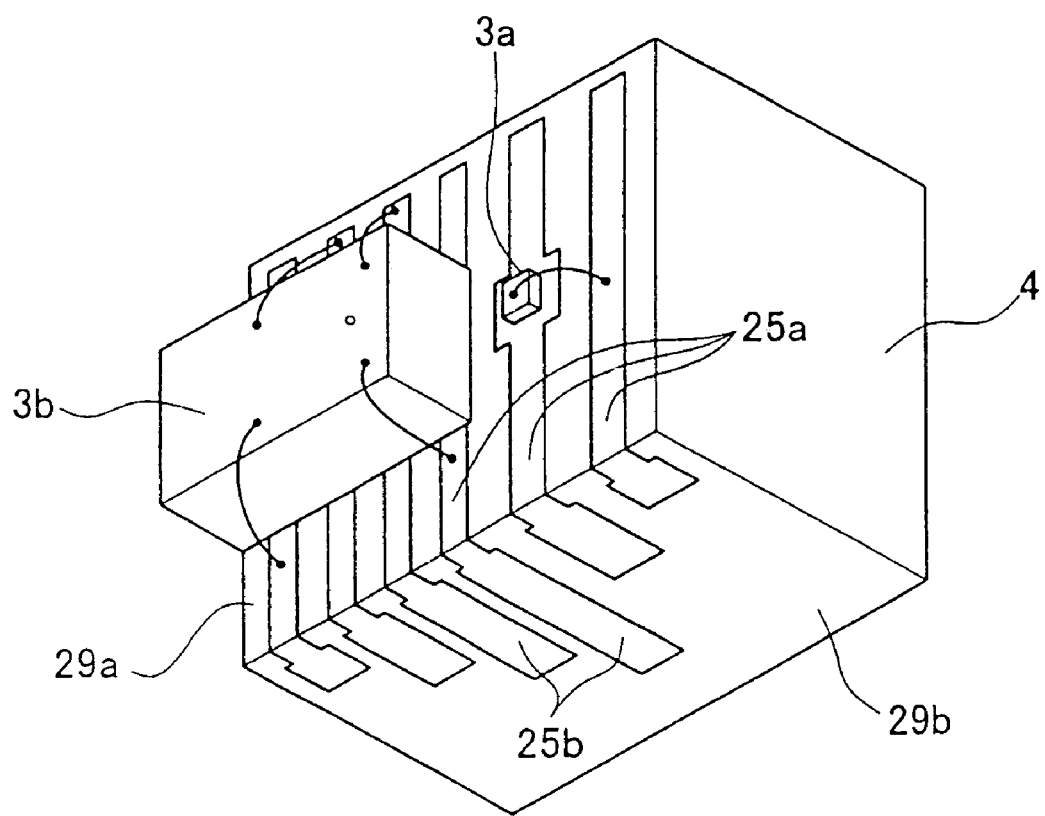
Figure 7A:
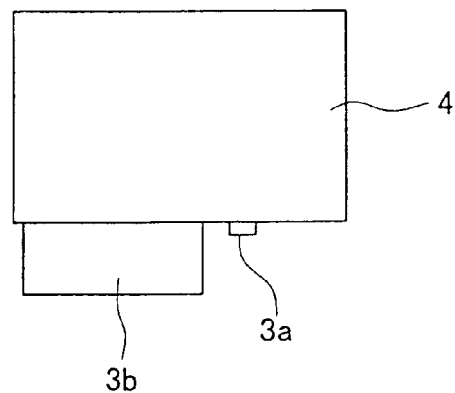
FIG. 7A is a plan view of the optical element-fitted mount of FIG. 6.
Figure 7B:
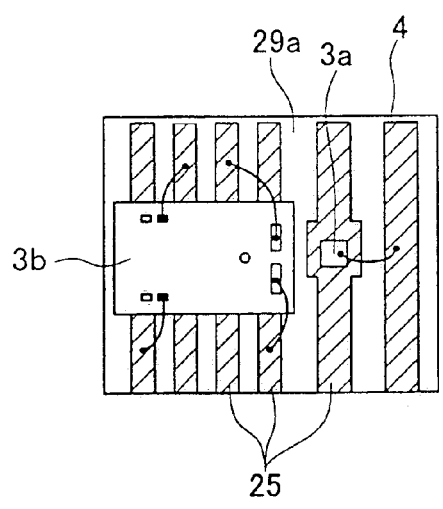
FIG. 7B is a front view of the same.
Figure 7D:
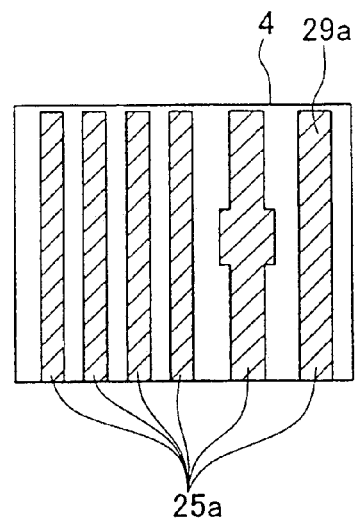
FIG. 7D is a front view of the mount prior to attaching the optical element.
Figure 7C:
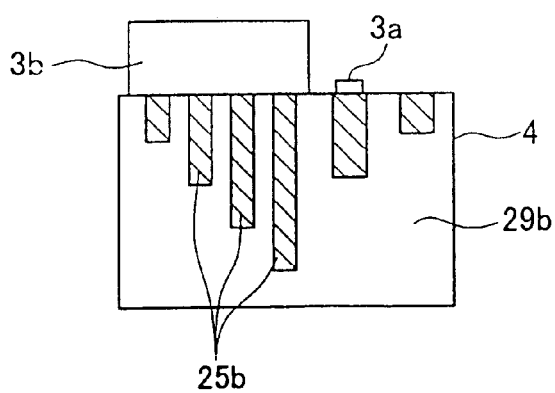
FIG. 7C is a bottom view of the same.

FIG. 6 is a perspective view seen from the bottom face side of said optical element-fitted mount 4, FIG. 7A is a plan view of the optical element-fitted mount 4, FIG. 7B is a front view, FIG. 7C is a bottom view, and FIG. 7D is a front view of the mount 4 prior to attaching the optical elements.

As shown in FIGS. 6 to 7, the mount (corresponding to the mount 4 applied in the optical module 11 of FIGS. 1 to 4), which the light-emitting element 3a and the light-recieving element 3b are both mounted on, comprises electrodes on its front face 29a and for example its bottom face 29b (front face electrodes represented by numeral 25a, bottom face electrodes represented by numeral 25b). The optical elements 3a and 3b are attached to the front face of the mount 4. In addition, the bottom face 29b is provided directly on the section of the lead pattern of the lead terminals 7 on the package 12 which are inside the package 12, and the electrodes 25b on the bottom face 29b are electrically connected to the lead terminals 7. That is, the connection is made by what is termed a flip-chip method. Therefore, the sections of the lead terminals 7 which are inside the package 12 are shaped so that their bases are collected at a position on the bottom face of the mount 4, and in addition, each makes contact with one of the electrodes 25b on the bottom face 29b. The electrodes 25b on the bottom face of the mount 4 need only be set to a thickness which is appropriate for a connection method explained later.

Metal-plated copper or copper alloy, or such like, is used as the material of the lead terminals 7.

Furthermore, methods for directly connecting the electrodes 25b on the bottom face 29b of the abovementioned mount 4 to the lead terminals 7 include methods such as (1) directly crimping a metal-plated face (the electrodes 25b on the bottom face of the mount 4) to a metal-plated face (lead terminals 7) by ultrasonic waves, (2) joining a metal-plated face (the electrodes 25b on the bottom face of the mount 4) to a metal-plated face (lead terminals 7) by using an anisotropic conductive paste or an anisotropic conductive film therebetween, and (3) thermal crimping of metal wire bumps and soldered bumps.

In the optical module 11 described above, the interconnections from the optical elements 3a and 3b, or from the mount 4, to the lead terminals 7 is short.

Furthermore, since there are hardly any restrictions on the width of the interconnections (electrodes) of the mount 4, their conductivity can easily be increased by making them wider.

Furthermore, since there is no bonding wire between the mount 4 and the lead terminals 7 of the package 12, few electromagnetic waves are emitted and few electromagnetic waves are received from the outside. Therefore, little noise enters the electrical signals. Further, it also becomes possible to operate the optical elements by using frequencies higher than 1 GHz.

Since there is no bonding wire between the mount 4 and the package 12, the package can be miniturized. Incidentally, although there are still bonding wires from the optical elements 3a and 3b to the pattern on the mount 4, these wire interconnections are short enough not to cause any particular problems regarding electromagnetic waves.

Since lengthy bonding wire need not be attached between the mount 4 and the package 12, the workability of assembling the optical module is improved. Moreover, there is no longer any problem of deterioration caused by peeling at the bonding wire connection points.

Optical components such as mirrors and prisms are not required, making the constitution simple.

(Second Aspect)

FIGS. 8A to 9B show a second aspect.

Figure 8A:
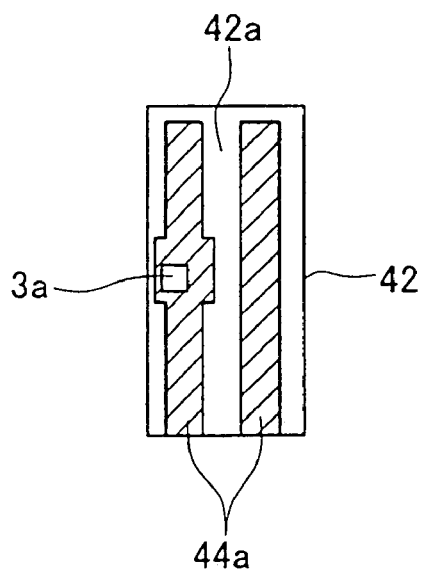
FIG. 8A is a front view of the optical element-fitted mount provided in an optical module of the type in FIG. 5.
Figure 8B:
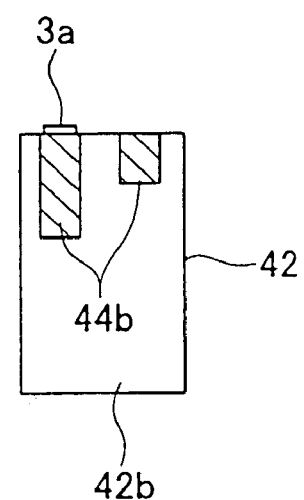
FIG. 8B is a bottom view of the same.
Figure 9A:
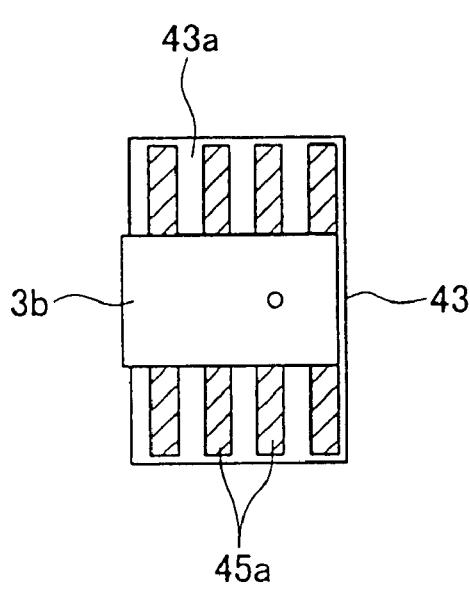
FIG. 9A is a front view of the optical element-fitted mount in the optical module of FIG. 8.
Figure 9B:
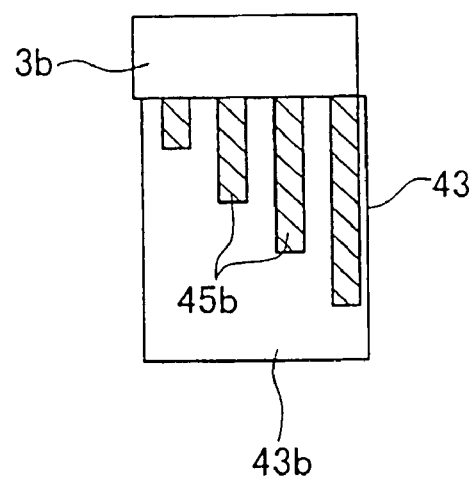
FIG. 9B is a bottom view.

This aspect relates to a mount which the light-emitting element 3a and the light-receiving element 3b are individually mounted on, such as the mounts 26a and 26b of FIG. 5. This aspect will be explained as applicable to the package 12b of the optical module of FIG. 5, but in the diagrams, reference numeral 42 is appended to the mount for mounting the light-emitting element 3a, and reference numeral 43 is appended to the light-receiving element 3b. FIG. 8A is a front view of the mount 42 which the light-emitting element 3a is attached to, FIG. 8B is a bottom view of the same, FIG. 9A is a front view of the mount 43 which the light-emitting element 3b is attached to, and FIG. 9B is a bottom view of the same.

Similar to the mount 4 described above, the mounts 42 and 43 comprise electrodes on their front faces 42a and 43a and their bottom faces 42b and 43b (front face electrodes represented by numerals 44a and 45a, bottom face electrodes represented by numerals 44b and 45b). The optical elements 3a and 3b are attached to the front faces 42a and 43a of the mounts 42 and 43. In addition, the bottom faces 42b and 43b are provided directly on the sections of the lead pattern of the lead terminals 7 of the package 12b, and are electrically connected to the lead terminals 7. The shape of the portion of the lead terminals 7 inside the package 12b corresponds to the arrangement of the electrodes on the bottom faces of the two mounts 42 and 43.

According to this optical module, the optical elements 3a and 3b deviate to the front and rear. Consequently, there is little influence of electrical noise.

(Third Aspect)

A third aspect of the mount will be explained with reference to FIGS. 10A to 11B.

Figure 10A:
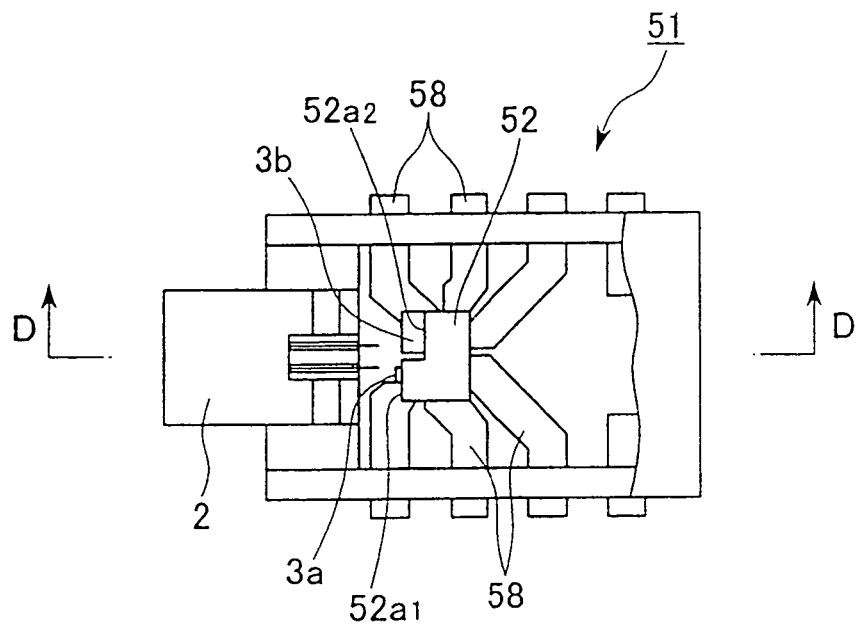
FIG. 10A shows the detailed structure of the optical module comprising yet another mount, being a partially cut-away plan view of the optical module.
Figure 10B:
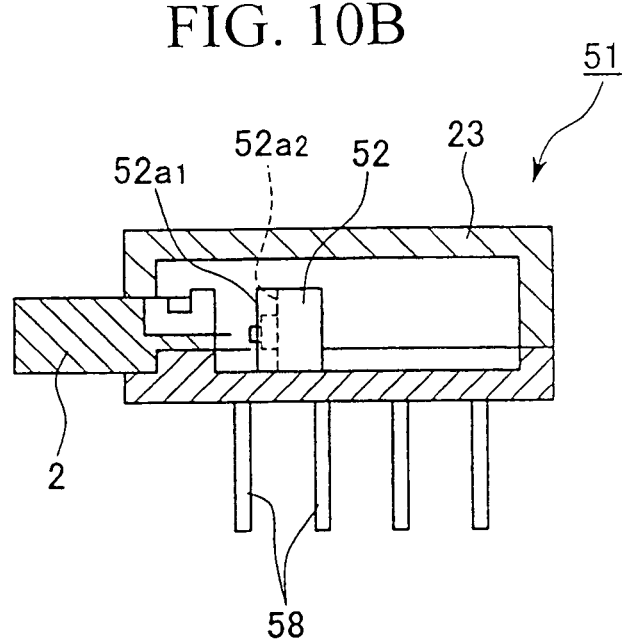
FIG. 10B is a cross-sectional view taken along the line D to D of the FIG. 10A.

The optical module 15 shown in FIGS. 10A and 10B is made step-shaped, having a step in the front-rear direction, and the light-emitting element 3a and the light-receiving element 3b are attached separately to the front side face 52a1 and the rear side face 52a2 of said step of the mount 52. Incidentally, this optical module 15 also comprises a positioning stand for positioning the optical fibers with respect to the optical elements, but this positioning stand is not shown in the diagrams.

Figure 11A:
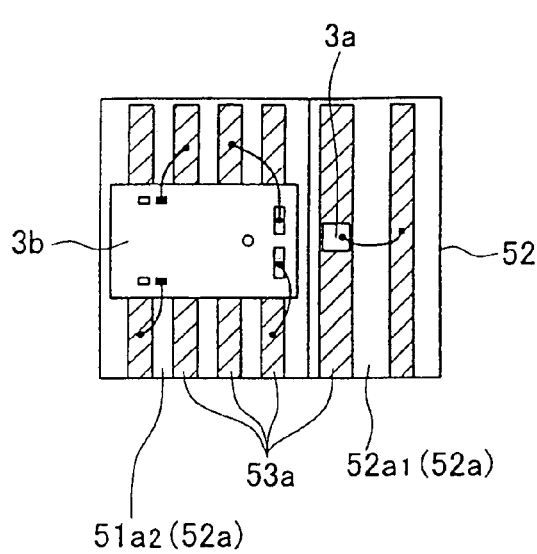
FIG. 11A is a front view of the optical element-fitted mount in the optical module of FIG. 10A.
Figure 11B:
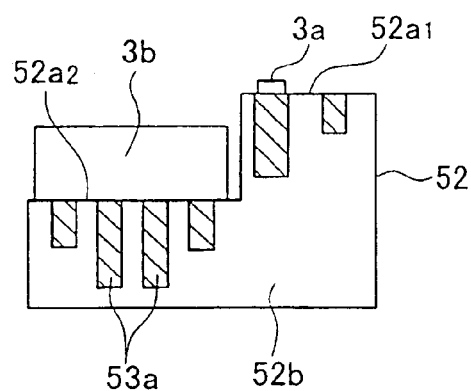
FIG. 11B is a bottom view of the same.

FIG. 11A is a front view of the mount 52, and FIG. 11B is a bottom view. Similar to the mount 4 already described above, the mount 52 comprises electrodes joining its front face 52a and its bottom face 52b (front face electrode represented by numeral 53a, bottom face electrode represented by numeral 53b). As above, the light-emitting element 3a is attached to the front side face 52a11 and the light-receiving element 3b is attached to the rear side face 52a2 of the step of the mount 52. Then, the bottom face 52b of the mount 52 is provided directly on the section of the lead pattern of the lead terminals 58 on the package 12 which are inside the package 12 section, and electrically connected to these lead terminals 58. The shape of the portion of the lead terminals 58 corresponds to the arrangement of the electrodes on the bottom face of the mount 52.

According to this optical module 51, the optical elements 3a and 3b are separated at the front and rear. Consequently, there is little influence of electrical noise.

In the aspects described above, there are two optical elements comprising the light-emitting element 3a and the light-receiving element 3b, but this invention can be applied in cases where there are three or more optical elements. In such cases, three or more optical elements can be attached to one mount.

Furthermore, each of the above aspects is ideal for application in an optical module which uses face light-emitting-type optical elements, but can also be applied in an optical module using edge light-emitting optical elements.

Furthermore, the ferrule (optical connector section) which is provided together with the package 12 is not limited to the ferrule of the pin fitting positioning method (MT connector) of this embodiment. For example, a ferrule of a method for connecting ferrules inside a fitting sleeve for positioning, and the like, can be considered.

As explained so far, the following advantages are obtained by a constitution wherein electrodes provided on the side faces of a mount, which optical elements are attached to, are directly connected to lead terminals of a package.

(1) Since the electrodes on the bottom face of the mount, which the optical elements are attached to, are directly connected to the lead terminals, the distance of the electrical interconnections from the optical elements or the mount to the lead terminals is short.

(2) Since there are few restrictions on the width of the interconnections (electrodes) of the mount, their conductivity can easily be increased by making them wider.

(3) Since there is no bonding wire between the mount and the lead terminals of the package, few electromagnetic waves are generated and few electromagnetic waves are received from the outside. Therefore, little noise enters the electrical signals. Further, it is also possible to operate the optical elements at frequencies higher than 1 GHz.

(4) Since there is no bonding wire between the mount and the package, the package can be miniturized.

(5) Since long bonding wires need not be attached between the mount and the package, the workability of assembling the optical module is improved. Moreover, there is no longer any problem of deterioration caused by peeling at the bonding wire connection points.

(6) Optical components such as mirrors and prisms are not needed, thereby making the constitution simple.

Second Embodiment

Next, a second embodiment of its will be explained with reference to FIGS. 15 to 18.

Figure 15A:
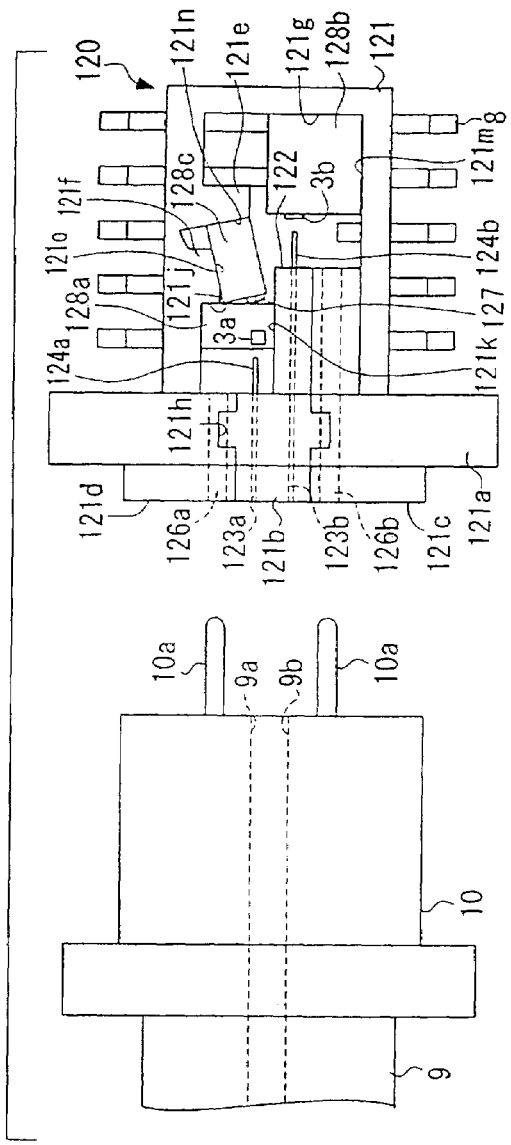
FIG. 15A is a plan view of an optical module according to a second embodiment of this invention.
Figure 15B:
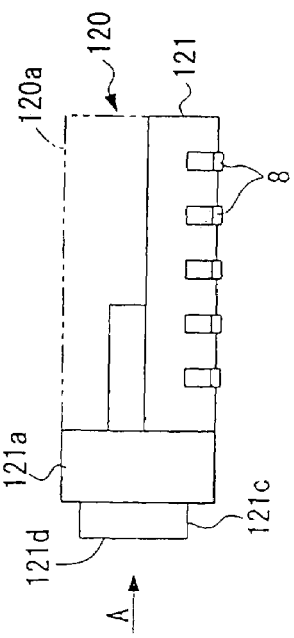
FIG. 15B is a front view.
Figure 15C:
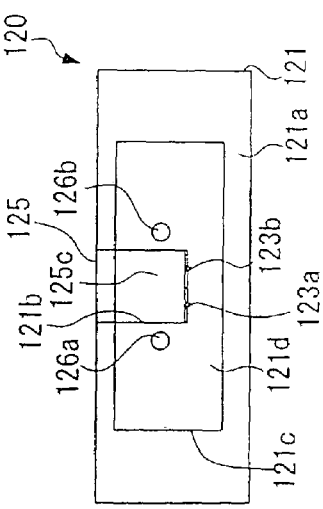
FIG. 15C is a view from the arrow A of FIG. 15B.
Figure 16:
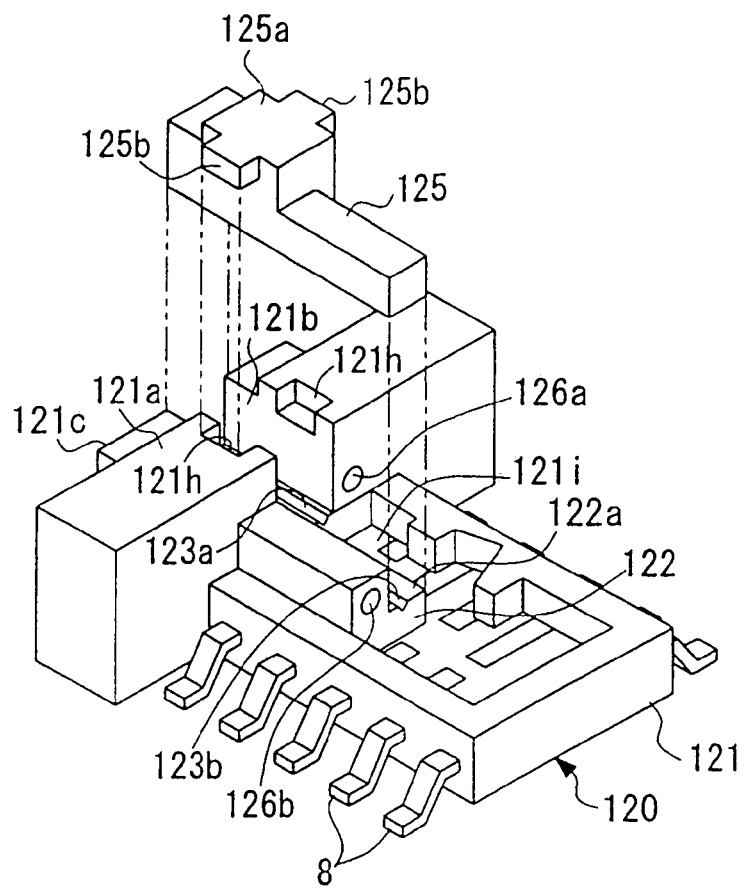
FIG. 16 is an exploded perspective view showing the internal structure of the package, and the pressing member applied in the optical module, when the mount and the like is extracted in the optical module of FIGS. 15A to 15C.
Figure 17:
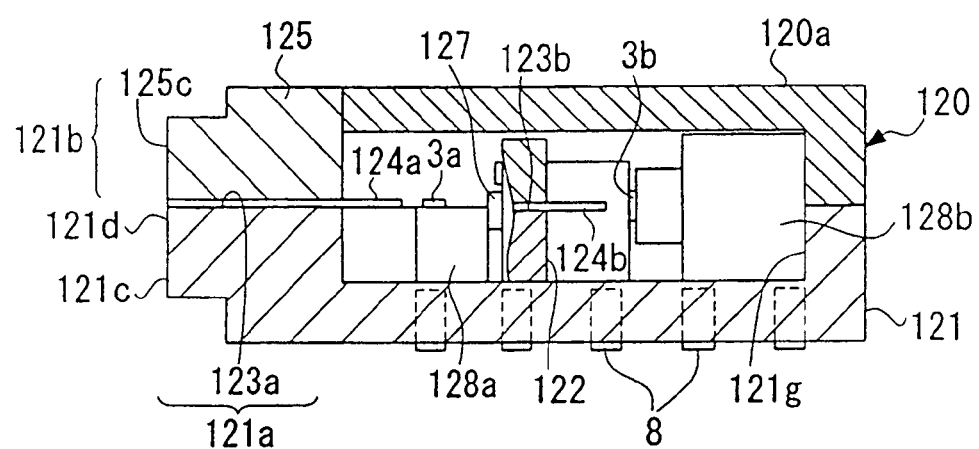
FIG. 17 is a frontal cross-sectional view of the optical module of FIGS. 15A to 15C, and shows the vicinity of the light-emitting element and the vicinity of the photodiode.

FIG. 15A is a plan view of an optical module 120 according to the second embodiment of this invention, FIG. 15B is a front view, and FIG. 15C is a view from the arrow A of FIG. 15B. FIG. 16 is a perspective view showing the internal structure of the package of the optical module 120 when the mount and the like is removed. FIG. 17 is a cross-sectional view showing a state when a pressing member 125 is provided on a positioning stand 122 of the optical module 120 of FIGS. 15A to 15C, and shows the vicinity of the light-emitting element 3a and the vicinity of the light-receiving element 3b.

As shown in FIGS. 15A, 15B, 15C, and 16, in this optical module 120, the positioning grooves 123a and 123b on the positioning stand 122 of the package 121, which contains the optical elements 3a and 3b, precisely aligns the position of the optical fibers 124a and 124b with respect to the optical elements 3a and 3b. The optical fibers 124a and 124b provided in the positioning grooves 123a and 123b are pressed into the positioning grooves 123a and 123b by a pressing member 125, provided on the positioning stand 122, and secured so that they do not deviate from this position. The package 121 comprises a tray-like main body which is tightly sealed by a lid 120a (see FIGS. 15B and 17).

The positioning stand 122 extends from the vicinity of the optical elements 3a and 3b to inside a notch 121b, provided in the package side wall section 121a. The positioning grooves 123a and 123b pass through the positioning stand 122, one end facing the optical elements 3a and 3b and the other end reaching a join end face 121d at the tip of a protruding section 121c, which protrudes outside the package side wall section 121a, and passing therethrough. The optical fibers 124a and 124b, which are positioned at the positioning stand 122, protrude slightly from the positioning stand 122 and are precisely positioned at a position where they can be optically coupled with the optical elements 3a and 3b. At the opposite side, they are exposed and almost face-to-face with the join end face 121d. Optical fibers (naked fibers) having a diameter of, for example, 125 µm are used as the optical fibers 124a and 124b. The tips of the completely positioned optical fibers 124a and 124b are securely buried in transparent resin for refractive index adjustment which fills the sections near the optical elements 3a and 3b.

Incidentally, a single mode optical fiber should preferably be used as the optical fiber 124a on the light-emitting element 3a side, and a multimode optical fiber having a larger core diameter than said single mode optical fiber should preferably be used as the optical fiber 124b on the light-receiving element 3b side. The single mode optical fiber has a core diameter of, for example, approximately several µm, and the multimode optical fiber has a core diameter of, for example, approximately several tens of µm. The optical fibers on the external optical connector side connected to the optical module 120 comprise both single mode and multimode optical fibers. As described above, in a constitution where the single mode optical fiber is used on the light-emitting element 3a side and the multimode optical fiber is used on the light-receiving element 3b side, the input/output efficiency can be increased irrespective of whether the optical fiber on the external optical signals side is single mode or multimode. That is, radiation of light from the multimode optical fiber to the single mode optical fiber becomes more efficient, but is difficult in the reverse direction. In view of this, as already mentioned, in a constitution where the single mode optical fiber is used on the light-emitting element 3a side and the multimode optical fiber is used on the light-receiving element 3b side, the input/output efficiency between the optical elements 3a and 3b can be increased irrespective of whether the optical fiber on the external optical signals side is single mode or multimode.

Furthermore, a semiconductor laser (LD) is used as the light-emitting element 3a, and a photodiode or the like fitted with a preamplifier is used as the light-receiving element 3b.

An optical connector 10A having a constitution for positioning optical fibers by a pin-coupling method, in the same way as the MT connector, is butt-connected to said join end face 121d. Fitting pins 10a on the optical connector 10A side are inserted and fitted into-fitting pin holes 126a and 126b of the package side wall section 121a (comprising the protruding section 121c) on both sides of the notch section 121b, thereby positioning the optical connector 10A with respect to the protruding section 121c, centering it and butt-connecting it, while maintaining positioning precision between the optical fibers 9a and 9b on the optical connector 10A side and the optical fibers 124a and 124b on the optical module 120 side. The protruding section 121c has a constitution exactly like the tip section (near the join end face) of an MT connector, the distance between the fitting pin holes and the distance between the positioning grooves being in correspondence with positioning between the connected optical connector. Ideally, the join end face 121d is polished.

The optical module 120 and the optical connector 10A should preferably be made as small as possible so as not to increase the scale of a receptacle 13 and an optical connector plug 15 (both explained later. See FIGS. 19A and 19B) which they are incorporated in. As one example which obtains the desired characteristics, the join end face of the optical connector 10A may for instance be a rectangle having a width of 3 mm×a length of 4.4 mm, which is smaller than an MT connector stipulated by JIS C5981 having a width of 2.5 mm×a length of 6.4 mm; the distance between the fitting pins 10a may be 2.6 mm, which is smaller than the 4.6 mm stipulated by JIS C 5981; and the centering axis distance of the optical fibers 124a and 124b may be set to 0.75 mm, etc. The distance between the fitting pin holes 126a and 126b matches the distance between the fitting pins 10a.

As shown in FIGS. 19A and 19B, the optical module 120 is stored in a receptacle 13 which an optical connector plug 15 is inserted into. The optical module 120 is mounted on an electrical circuit board 14, incorporated in the receptacle 13. Lead terminals 8 protruding from the package 121 to the outside are electrically connected and secured by soldering or the like to an electrical circuit pattern on the electrical circuit board 14. Terminals 14a (pin terminals) protrude from the outside of the receptacle 13, and are electrically connected to the electrical circuit board 14. A control apparatus, a gauge, and the like, which are electrically connected to these terminals 14a, control the light-generation of the light-emitting element 3a in the optical module 120, and receive light-receiving signals from the light-receiving element 3b, and the like. On the other hand, the optical connector 10A is incorporated in an exposed state at the tip of the housing 15a of the optical connector plug 15.

When the optical connector plug 15 is inserted into a cylindrical adaptor section 13a, provided to said receptacle 13, the internal constitution of the adaptor section 13a positions the optical connector plug 15. Consequently, the join end face 10b of the optical connector 10A at the tip of the optical connector plug 15 is positioned with respect to the join end face 121d of the optical module 120 which is provided at the back section of the insertion direction to the adaptor section 13a. As a result, the join end faces 10b and 121d can be fitted together. At this time, the fitting pins 10a on the optical connector 10A side become inserted in the fitting pin holes 126a and 126b on the optical module 120 side, whereby the optical fibers 9a and 9b on the optical connector 10A side are positioned precisely with respect to the optical fibers 124a and 124b on the optical module 120 side, and are butt-connected thereto. Furthermore, a latch 15b protrudes from the housing 15a of the optical connector plug 15, and meshes with a meshing section 13b (in the diagrams, a meshing hole provided in the adaptor section 13a) on the receptacle 13 side, thereby preventing the optical connector plug 15 from escaping from the adaptor section 13a. In addition, the force of a spring (not shown in the diagram) inside the housing 15a acts as a butt force on the optical connector 10A with respect to the optical module 120, thereby obtaining a desired low connection loss between the butt-connected optical fibers 9a, 9b, 124a, and 124b. In the connected state, when a lever for mesh-releasing 15c, which is exposed on the outside of the adaptor section 13a, is manipulated so that the latch 15b is detached from the meshing section 13b, the optical connector plug 15 can be extracted from the receptacle 13, cancelling its connection to the optical module 120.

Incidentally, the distance between the fitting pins 10a of the optical connector 10A and the distance between the optical fibers 9a and 9b which are exposed, the distance between the fitting pin holes 12 on the optical module 120 side and the distance between the optical fibers 124a and 124b on the join end face 121d, are set so as to match between the optical connector 10A and the optical module 120.

Furthermore, positioning between the optical module 120 and the optical connector 10A can be achieved by inserting the fitting pins 10a, which are secured in a butt state to the optical module 120 side, into and the fitting pin holes on the optical connector 10A side. In this case, the fitting pin 10a is inserted and fitted beforehand in the fitting pin hole 126a of the optical module 120, and secured from escaping by using adhesive, a pin clamp member, and the like.

Returning to FIG. 15, FIG. 16, and 17, the internal section of the package 121 will be explained.

Grooves having a superior centering function, such as V-grooves, U-grooves, and round-grooves, are used for the positioning grooves 123a and 123b. In this embodiment, V-grooves are shown by way of example. In FIGS. 15A, 15B, and 15C, the light-emitting element 3a and the light-receiving element 3b are provided on mounts 128a and 128b. The light-receiving element 3b has a preamplifier fitted thereto. Further, in the diagrams, reference numeral 127 represents a light-receiving element for monitor, which is provided on a mount 128c. FIG. 15A shows the mounts 128a to 128c, but these are omitted from FIGS. 15B and 15C. As shown in FIG. 15A, the mounts 128a to 128c are cuboid or cubic bare chips, and are precisely positioned so that their side faces, which obtain a highly precise degree of flatness, directly contact the protruding walls 121e and 121f provided inside the package 121 and the inner wall 121g. As a consequence, the optical elements 3a, 3b, and 127, are positioned precisely at predetermined positions in the package 121. Likewise in the other embodiments, the mounts are cuboid or cubic bare chips which abut to the inner wall faces and the like of the package, and are similarly positioned by the passive method.

Figure 18:
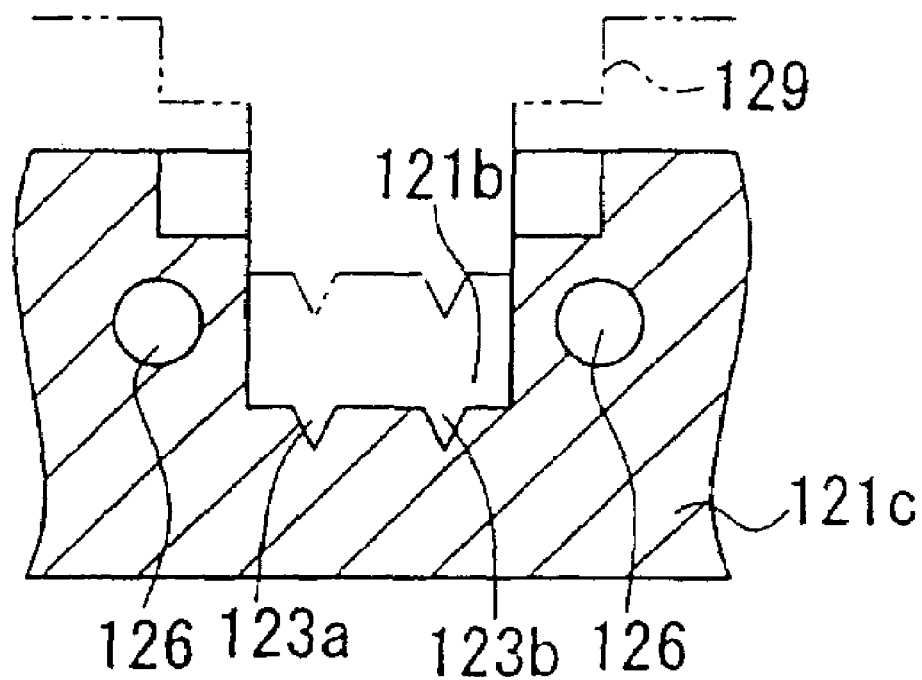
FIG. 18 is a diagram showing the casting mold of the package of the optical module of FIG. 16, being a cross-sectional view of the vicinity of the notch section.

In the case of the package 121 comprising a resin such as plastic, it is normal to provide the positioning stand 122 in a single body with the protruding walls 121e and 121f, the inner wall face 121g, and the like. Now, the protruding walls 121e and 121f, the inner wall face 121g, and the positioning stand 122 are molded by identical direction metal casts, and more specifically, as shown in FIG. 18, by upper and lower metal casts (FIG. 18 shows the vicinity of the notch section 121b. In FIG. 18, numeral 129 represents the upper cast. The lower cast is not shown). Therefore, it is easy to precisely position the positioning grooves 123a and 123b with respect to the protruding walls 121e and 121f, the inner wall face 121g, and the like. When the mounts 128a and 128b have been accurately positioned by the protruding walls 121e and 121f, the inner wall face 121g, and the like, the optical elements 3a and 3b which are mounted on these mounts 128a and 128b can be accurately positioned in the desired positions. In addition, a high degree of precision with the positioning grooves 123a and 123b can be maintained. Here, when the optical fibers 124a and 124b are positioned by the positioning grooves 123a and 123b, the optical fibers 124a and 124b become positioned with high precision at predetermined positions which optically couple to the optical elements 3a and 3b. However, the metal casts for forming the fitting pin hole 126a are separate from the metal casts for forming the package 121 inner wall and the positioning grooves 123a and 123b, whereby the positioning precision when connecting to the external optical connector is separately maintained.

The optical elements 3a and 3b are attached at stipulated positions on the cuboid mounts 128a to 128c, which have been positioned precisely by the protruding walls 121e and 121f in the package 121, the inner wall face 121g, and the like. When the tips of the optical fibers 124a and 124b have been positioned by the positioning grooves 123a and 123b on the positioning stand 122, the optical fibers 124a and 124b can be accurately positioned with high precision with respect to the optical elements 3a and 3b.

Conductive patterns are provided as appropriate on the surfaces of the mounts 128a to 128c. The conductive patterns on the mounts 128a to 128c when mounted on the bottom of the package 121 are electrically connected and secured by soldering or the like to the conductive pattern and the lead terminals 8 provided on the bottom of the package 121.

As shown in FIG. 15A, for example, the mount 128a is positioned by being provided so as to abut to a directly contacting face 121j, which is provided on the protruding wall 121f of the inner side of the package 121, and a directly contacting face 121k, which comprises a side face of the positioning stand 122. The relative orientation between the directly contacting faces 121j and 121k is perpendicular, and consequently, the orientation of the mount 128a can be accurately positioned. The orientation between the directly contacting face 121g (inner wall face 121g) and the directly contacting face 121m which position the mount 128b, and the orientation between the directly contacting faces 121n and 121o which position the mount 128c, are also perpendicular. The directly contacting faces which form a pair of perpendiculars directly contact the mounts 128b and 128c, thereby accurately positioning them. Incidentally, the mount 128c for the monitor element is positioned at a diagonal to the mount 128a for the light-emitting element 3a.

That is, the method of aligning the mounts 128a to 128c inside the package 121 is termed passive alignment, and is different from the method (termed the active method) of aligning while monitoring the optical input/output characteristics of the optical fibers 124a and 124b. By positioning using the passive method, the mounts 128a to 128c can be positioned easily and in a short period of time merely by directly contacting the predetermined directly contacting faces and the like, enabling positioning workability to be improved and reducing the assembly time of the optical module 120, and the like.

Incidentally, the positioning precision of the optical fibers 124a and 124b with respect to the optical elements 3a and 3b does not always signify an intention to improve the optical input/output characteristics between the optical fibers 124a and 124b and the optical elements 3a and 3b. For example, in the case where a semiconductor laser is used as the light-emitting element 3a, the optical power output from the optical module 120 (the light output from the tip of the join end face 121d of the optical fiber 124a) may be deliberately reduced for safety reasons. In a case such as this, inside the package 121, the directly contacting faces 121j and 1211k which directly contact the mount 128a for the light-emitting element 3a are provided so that there is a slight deviation in the centering of the light-emitting element 3a and the optical fiber 124a which faces it, and the mount 128a is positioned with an appropriate centering deviation. The same applies in the other embodiments.

The pressing member 125 which presses the optical fibers 124a and 124b into the positioning grooves 123a and 123b on the positioning stand 122 is secured to the positioning stand 122 by using adhesive or the like. The method of securing the pressing member 125 to the positioning stand 122 is not limited to adhesive, and various constitutions can be utilized such as clipping to the side of the package 121, or joining by using cavities and concavities.

As shown in FIG. 16, the pressing member 125 is approximately the same shape as the top face 122a (the face which the positioning grooves 123a and 123b are provided in) of the positioning stand 122, and can press the optical fibers 124a and 124b along the entire length of the positioning grooves 123a and 123b. A variety of material can be used to form the pressing member 125, such as metal, ceramic, glass, and alumina sintering body. However, considering the importance of there being no positional deviation between the optical fibers 124a and 124b when there are pressed into the positioning grooves 123a and 123b, a material having sufficient hardness and sufficiently low temperature changes should preferably be used.

Furthermore, the material for the pressing member 125 should preferably have excellent molding and processing characteristics, so that the shapes of, for example, the notch section 121b and the positioning stand 122 can easily be accommodated, and the freedom of design of all parts of the package 121 can be increased. For example, as shown in FIG. 15A, when the distances from the optical elements 3a and 3b to the package 121 side walls are different, the shape of the positioning stand 122 is designed as appropriate in order to obtain the positioning grooves 123a and 123b which correspond to the optical elements 3a and 3b. By molding the pressing member 125 which corresponds to the shape of the positioning stand 122, the optical fibers 124a and 124b can easily be pressed.

As shown in FIG. 16, the pressing member 125 comprises a groove insertion section 125a having approximately the same shape as the inner face of the notch section 121b, which is provided in a groove-like shape in the package side wall section 121a. The groove insertion section 125a is inserted into the notch section 121b, thereby increasing the workability of positioning the pressing member 125 with respect to the positioning stand 122. Furthermore, this is also effective in preventing positional deviation after being secured to the positioning stand 122. In consideration of the workability of positioning and prevention of positional deviation, the groove insertion section 125a should more preferably fit into the notch section 121b.

Moreover, the pressing member 125 comprises meshing sections 125b provided on its sides which mesh with the package side wall sections 121a on both sides of the notch section 121b, thereby restricting positional deviation the long directional of the positioning grooves 123a and 123b. Specifically, in FIG. 16, the pressing member 125 comprises protrusions provided on both sides as said meshing sections 125b, and the protrusions fit (by meshing) into concavities 121h provided in the package side wall sections 121a of the notch section 121b. As a consequence, the effects of improving the workability of positioning the pressing member 125 with respect to the positioning stand 122, and preventing positional deviation with respect to the positioning stand 122, can be more definitely achieved.

Incidentally, the meshing sections 125b are not limited to said protrusions, and various constitution can be used such as, for example, concavities which mesh by insertion or fitting of protrusions which protrude from the package side wall sections 121a, concavities and protrusions which mesh (insertion and fitting) in protrusions or concavities which are provided in positions other than the package side wall sections 121a, such as on the bottom 121i of the package 121 and the bottom of the notch section 121b, and such like.

As shown in FIG. 17, when the pressing member 125 of the optical module 120 of this aspect of this embodiment is positioned on the positioning stand 122, a side face 125c forms a join end face with the optical connector 10A together with the join end face 121d of the package 121 side. When the optical connector 10A is connected to the assembled optical module 120, wherein the securing and the like of the optical fibers 124a and 124b by the pressing member 125 has been completed, the join end face of the optical connector 10A abuts to the join end face comprising the join end face 121d of the package 121 side and the join end face 125c of the pressing member 125. By allowing the side face 25c of the pressing member 125 to function as a join end face, the support-pressure area is greater than when only the join end face 121d of the package 121 side is directly contacting the optical connector 10A, enabling it to be stabilized without distorting the abutting force with the optical connector 10A. Consequently, the optical fibers can be butt-connected with stability. The downside is that the pressing force from the optical connector 10A also acts on the pressing member 125, but since the pressing member 125 is prevented from deviating from its position by the insertion of the groove insertion section 125a into the notch section 121b, and by the meshing of the meshing sections 125b with the package 121 (in this aspect of the embodiment, the meshing sections 125b comprise protrusions which fitting into the concavities 121h in the package side wall section 121a), the pressing force from the optical connector 10A can be sustained without positional deviation. Moreover, the optical fibers 124a and 124b which are pressed into the positioning grooves 123a and 123b can be kept in position with stability. Even when attaching and removing the optical connector 10A to and from the optical module 120, the pressing member 125 does not deviate from its position, and the optical fibers 124a and 124b which are pressed into the positioning grooves 123a and 123b by the pressing member 125 do not deviate from their positions either. Thus, the positional precision of the optical fibers 124a and 124b is maintained with stability.

According to this optical module 120, the optical fibers 124a and 124b which are provided in the positioning grooves 123a and 123b are pressed by the pressing member 125, the precision of the optical fibers 124a and 124b with respect to the optical elements 3a and 3b can be maintained. This makes it possible to eliminate the positioning of the ferrule with respect to the package in the optical module of the first embodiment. Therefore, the workability of positioning the optical fibers 124a and 124b can be improved even further, and assembly can be carried out efficiently in a short time. Furthermore, in the conventional constitution where the ferrule is incorporated in the package, the constitution of the package becomes complex in order to position the ferrule. By contrast, in the optical module 120 according to this invention, the optical fibers 124a and 124b can be easily pressed merely by applying the pressing member 125 as appropriate to the positioning stand 122. Therefore, the constitution of the package 121 can be simplified, and it can be molded easily and with lower cost. Since the ferrule does not require a pressing member, there are fewer components than in the first embodiment, also contributing to lower costs. Moreover, since the package 121 has no special protrusions (e.g. as shown in FIG. 1, the ferrule 5 incorporated in a protruding state from the package 12) which might affect the positioning of the optical fibers 124a and 124b, the drawback of positional deviation of the optical fibers 124a and 124b caused by eternal forces acting on the protrusions can be avoided, enabling positioning precision to be maintained with stability over a long period of time. Since the pressing member for pressing the optical fibers 124a and 124b can be made smaller than the ferrule and the like used in conventional technology, the provision of the pressing member has a negligible effect on the internal design of the package 121. This achieves advantages that the degree of freedom regarding the positions and the like of the optical elements 3a and 3b inside the package 121 can be maintained, and the optical module 120 (more specifically, the package 121) can be miniturized.

Further, positioning the pressing member 125 by incorporating it in the pressing member 125 in the notch section 121b of the package 121, and by the meshing between the meshing sections 125b and the package 121 side (specifically, meshing between the meshing sections 125b comprising protrusions and the concavities 121h on both sides of the notch section 121b of the package 121) makes it possible to position the pressing member 125 easily when assembling the optical module 120. Moreover, since positional deviation is prevented after pressing the optical fibers 124a and 124b, there is an advantage that the positional precision of the optical fibers 124a and 124b can be maintained with stability over a long period of time.

Incidentally, the optical module of the type of this invention is not limited to the constitution described above. For example, the shape of the positioning stand 122, the shape of the pressing member which presses the optical fibers into the positioning grooves on the positioning stand, and the like, can be changed as appropriate. Furthermore, although this embodiment describes a notch section and the like in the package side wall section as the constitution for positioning the pressing member in the package, the constitution is not limited to this, and a variety of constitutions are possible, e.g. a constitution wherein a plurality of positioning walls and the like, which directly contact the side face of the pressing member in the manner of point contacts, are provided in the package, and the like. Furthermore, this embodiment describes an example constitution in which the pressing member presses part of the join end face which the optical connector directly contacts, but the constitution is not limited to this. For example, a pressing member which is provided further inside the package than the join end face, and which does not touch the optical connector connected to the optical module, can be used.

It goes without saying that various changes can be made to the shape of the package, the type of optical elements provided in the package, and the like. There may be one or three or more optical elements. For example, when a mount carrying a plurality of optical elements (LD array and PD array) is mounted in a package, the plurality of optical elements can be positioned in the package in a single operation. In this case, the number, position, and the like, of the positioning grooves on the positioning stand are, of course, adjusted in accordance with the number of optical elements.

The formation of the optical fiber insertion holes and fitting pin holes is not limited to metal casts. For example, they can be formed precisely by using laser beam processing and the like. In this case also, the positioning of the laser beam for processing need only be adjusted at one of XYZ, ultimately enabling the relative positional relationship between the fitting pin holes and the optical fiber insertion holes to be precisely maintained.

Third Embodiment

Next, a third embodiment of this invention will be explained with reference to FIGS. 20A to 24B.

Figure 21:
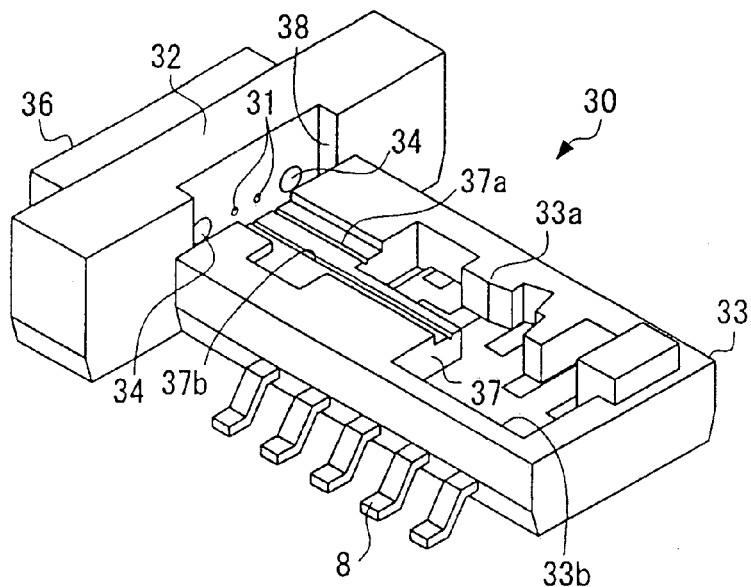
FIG. 21 is a perspective view of the package internal structure when the mount and the like are removed from the optical module of FIGS. 20A to 20C.
Figure 22A:
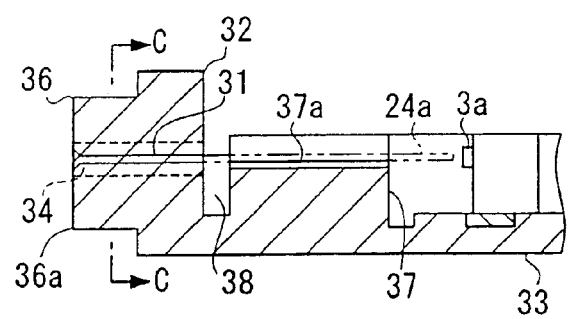
FIG. 22A is a frontal cross-sectional view of the vicinity of optical fiber insertion holes which are provided in the optical module of FIGS. 20A to 20C.
Figure 22B:
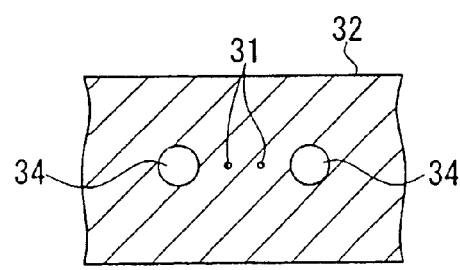
FIG. 22B is a cross-sectional view taken along the line C to C of FIG. 22A and shows the vicinity of the optical fiber insertion holes in enlargement.
Figure 22C:
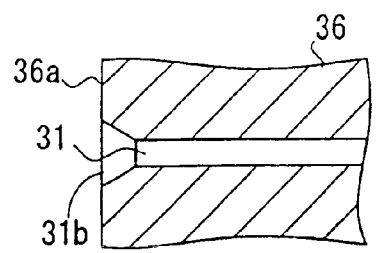
FIG. 22C is a frontal cross-sectional view of the vicinity of the optical fiber insertion holes.

FIG. 20A is a plan view of an optical module 30 of this embodiment, FIG. 20B is a front view, and FIG. 20C is a view from the arrow B of FIG. 20B. FIG. 21 is a perspective view of the package internal structure when the mount and the like are removed from the optical module 30. FIG. 22A is a frontal cross-sectional view of the vicinity of optical fiber insertion holes 31 which are provided in the optical module 30 of FIGS. 20A to 20C, FIG. 22B is a cross-sectional view taken along the line C to C of FIG. 22A and shows the vicinity of the optical fiber insertion holes 31 in enlargement, and FIG. 22C is a frontal cross-sectional view of the vicinity of the optical fiber insertion holes 31. Incidentally, the mounts 28a to 28c provided in the package 33 are shown in FIG. 20A, but are omitted from the other diagrams.

As shown in FIG. 20B, the package 33 is sealed with a cap 20a.

As shown in FIGS. 20A, 20B, 20C to 22A, and 22B, fitting pin holes 34, which the fitting pins 10a of the optical connector 10A (see FIGS. 24A and 24B) side connected from the outside are inserted into, are provided in two places in the side wall 32 of the package 33 comprising this optical module 30. A plurality of optical fiber insertion holes 31 (two in this embodiment) which the optical fibers 24a and 24b are inserted in, are provided between the fitting pin holes 34. Furthermore, one of the fitting pin holes 34 and the optical fiber insertion holes 31 are all provided parallel to each other. The fitting pin holes 34 and the optical fiber insertion holes 31 are also provided through the protrusion 36 which protrudes to the outside of the side wall 32, and in the protruding direction tip face (outer face) of the protrusion 36 comprising a join end face 36a. The protrusion 36 has exactly the same constitution as the vicinity of the join end face of an MT connector.

The optical module 30 and the optical connector 10A should preferably be made as small as possible so as not to increase the scale of the receptacle 13 and the optical connector plug 15 (both explained later) which they are incorporated in. As one example which obtains the desired characteristics, the join end face of the optical connector 10A may for instance be a rectangle having a width of 3 mm×a length of 4.4 mm, which is smaller than an MT connector stipulated by JIS C 5981 having a width of 2.5 mm×a length of 6.4 mm; the distance between the fitting pins 10a may be 2.6 mm, which is smaller than the 4.6 mm stipulated by JIS C 5981; and the distance between the optical fiber insertion holes 31 may be set to 0.75 mm, etc. The distance between the fitting pin holes 34 of the optical module 30 side matches the distance between the fitting pins 10a.

As shown in FIGS. 24A and 24B, the optical module 30 is stored in a receptacle 13 which an optical connector plug 15 is inserted into. The optical module 30 is mounted on an electrical circuit board 14, incorporated in the receptacle 13. Lead terminals 8 protruding from the package 33 to the outside are electrically connected and secured by soldering or the like to an electrical circuit pattern on the electrical circuit board 14. Terminals 14a (pin terminals) protrude from the outside of the receptacle 13, and are electrically connected to the electrical circuit board 14. A control apparatus, a gauge, and the like, which are electrically connected to these terminals 14a, control the light-emission of the light-emitting element 3a in the optical module 30, and receive light-receiving signals from the light-receiving element 3b, and the like. On the other hand, the optical connector 10A is incorporated in an exposed state at the tip of the housing 15a of the optical connector plug 15.

When the optical connector plug 15 is inserted into a cylindrical adaptor section 13a, provided to said receptacle 13, the internal constitution of the adaptor section 13a positions the optical connector plug 15. Consequently, the join end face 10b of the optical connector 10A at the tip of the optical connector plug 15 is positioned with respect to the join end face 36a of the optical module 30 which is provided at the back section of the insertion direction to the adaptor section 13a. As a result, the join end faces 10b and 36a can be fitted together. At this time, the fitting pins 10a on the optical connector 10A side become inserted in the fitting pin holes 34 on the optical module 30 side, whereby the optical fibers 9a and 9b on the optical connector 10A side are positioned precisely with respect to the optical fibers 24a and 24b on the optical module 30 side, and are butt-connected thereto. Furthermore, a latch 15b protrudes from the housing 15a of the optical connector plug 15, and meshes with a meshing section 13b (in the diagrams, a meshing hole provided in the adaptor section 13a) on the receptacle 13 side, thereby preventing the optical connector plug 15 from escaping from the adaptor section 13a. In addition, the force of a spring (not shown in the diagram) inside the housing 15a acts as a butt force on the optical connector 10A with respect to the optical module 30, thereby obtaining a desired low connection loss between the butt-connected optical fibers 9a, 9b, 24a, and 24b. In the connected state, when a lever for mesh-releasing 15c, which is exposed on the outside of the adaptor section 13a, is manipulated so that the latch 15b is detached from the meshing section 13b, the optical connector plug 15 can be extracted from the receptacle 13, cancelling its connection to the optical module 30.

Incidentally, the distance between the fitting pins 10a of the optical connector 10A and the distance between the optical fibers 9a and 9b which are exposed, the distance between the fitting pin holes 12 on the optical module 30 side and the distance between the optical fibers 24a and 24b on the join end face 36a, are set so as to match between the optical connector 10A and the optical module 30.

Furthermore, positioning between the optical module 30 and the optical connector 10A can be achieved by inserting the fitting pins 10a, which are secured in a butt state to the optical module 30 side, into and the fitting pin holes on the optical connector 10A side. In this case, the fitting pin 10a is inserted and fitted beforehand in the fitting pin hole 34 of the optical module 30, and secured from escaping by using adhesive, a pin clamp member, and the like.

The optical fiber insertion holes 31 perform the function of positioning the optical fibers 24a and 24b, which are inserted from outside of the package 33, so that they can be optically coupled to the optical elements 3a and 3b, and are provided individually to the optical elements 3a and 3b. The optical fiber insertion holes 31 are perfectly circular in cross-section, and position the optical fibers 24a and 24b with high precision in predetermined positions so that they can be optically coupled to the optical elements 3a and 3b. For the optical fibers 24a and 24b (naked fibers) having diameters of, for example, 125 µm, the optical fiber insertion holes 31 are set to be perfect circles in cross-section of 126 µm. Therefore, the optical fibers 24a and 24b inserted into the optical fiber insertion holes 31 are positioned with high precision on the centering axis line of the optical fiber insertion holes 31. Moreover, since the optical fibers 24a and 24b are restricted so that they do not positionally deviate in either direction from the optical fiber insertion holes 31, which are perfectly circular in cross-section, the precise positioning of the optical fibers 24a and 24b with respect to the optical elements 3a and 3b can be maintained with stability, whereby the radiation of light from the light-emitting element 3a to the optical fiber 24a and the receiving of light, transmitted from the optical fiber 24b, by the light-receiving element 3b can be kept efficient at all times.

Incidentally, a single mode optical fiber should preferably be used as the optical fiber 24a on the light-emitting element 3a side, and a multimode optical fiber having a larger core diameter than said single mode optical fiber should preferably be used as the optical fiber 24b on the light-receiving element 3b side. As a consequence, the optical input/output efficiency between the optical fibers on the external optical connector side can be increased as described above. The single mode optical fiber has a core diameter of for example approximately μm, and the multimode optical fiber has a core diameter of for example approximately several tens of μm.

Furthermore, a semiconductor laser (LD) is used as the light-emitting element 3*a*, and a photodiode or the like fitted with a preamplifier is used as the light-receiving element 3*b*.

Inside the package 33, the optical fibers 24*a* and 24*b* protrude from the optical fiber insertion holes 31 toward the optical elements 3*a* and 3*b*. The optical fibers 24*a* and 24*b* are inserted through positioning grooves 37*a* and 37*b* on the positioning stand 37, provided between the module side wall 32 and the optical elements 3*a* and 3*b*, and positioned with respect to the optical elements 3*a* and 3*b*. The positioning grooves 37*a* and 37*b* comprise V grooves, U grooves, and the like. The optical fibers 24*a* and 24*b* provided in the positioning grooves 37*a* and 37*b* are pressed into the positioning grooves 37*a* and 37*b* and prevented from deviating from their positions by a pressing member, which is secured by adhesive or the like to the top of the positioning stand 37.

The tips of the optical fibers 24*a* and 24*b* are protruding from the positioning stand 37 toward the optical elements 3*a* and 3*b*. Since the length of the protrusions is between 1 to 2 mm or less than 1 mm, the tips of the optical fibers 24*a* and 24*b* reach the vicinity of the optical elements 3*a* and 3*b* while maintaining their precise positions in the positioning grooves 37*a* and 37*b* by their own rigidity. The tips of the completely positioned optical fibers 24*a* and 24*b* are securely buried and the like in transparent resin (refractive index matcher) which fills the sections near the optical elements 3*a* and 3*b*.

The optical elements 3*a* and 3*b* are attached in stipulated positions on the rectangular mounts 28*a* to 28*c*, positioned precisely by the protruding wall 33*a* and the inner wall 33*b* and the like in the package 33, and when the tips of the optical fibers 24*a* and 24*b* inserted from the optical fiber insertion holes 31 are positioned by the positioning grooves 37*a* and 37*b* on the positioning stand 37, highly precise positioning of the optical fibers 24*a* and 24*b* with respect to the optical elements 3*a* and 3*b* can be achieved. The mounts 28*a* to 28*c* comprise bare chips having side faces for positioning which obtain a highly precise degree of flatness, and are passive positioned with high precision so that their side faces for positioning abut to the protruding walls 33*a* and the inner wall 33*b* provided inside the package 33.

Conductive patterns are provided as appropriate on the surfaces of the mounts 28*a* to 28*c*. The conductive patterns on the mounts 28*a* to 28*c* when mounted on the bottom of the package 33 are electrically connected and secured by soldering or the like to the conductive pattern and the lead terminals 8 provided on the bottom of the package 33.

As shown in FIG. 20A, for example, the mount 28*a* is positioned by being provided so as to abut to a directly contacting face 33*c*, which is provided on the protruding wall 33*a* of the inner side of the package 33, and a side face 33*g* which is perpendicular to said directly contacting face 33*c* of the positioning stand 37, protruding from the package bottom 33*f*. The mount 28*b* is positioned by directly contacting the package inner wall face 33*b*, and the directly contacting face 33*i* which is provided perpendicular to the package inner wall face 33*b* at the protruding wall 33*h*, protruding inside the package 33. The mount 28*c* is positioned diagonal to the mount 28*a* for the light-emitting element 3*a* by directly contacting the directly contacting face 33*j*, provided at the tip of the protruding direction of the protruding wall 33*a* to the inside of the package 33, and the directly contacting 33*m*, provided on another protruding wall 33*k* adjacent to the protruding wall 33*a*. The directly contacting face 33 is perpendicular to the directly contacting face 33*j*. That is, the mounts 28*a* to 28*c* are accurately positioned in a plurality of different directions by directly contacting a plurality of directly contacting faces provided on the protruding walls 33*a*, 33*h*, and 33*k* inside the package 33.

That is, the method of aligning the mounts 28*a* to 28*c* inside the package 33 is termed passive alignment, and is different from the method (termed the active method) of aligning while monitoring the optical input/output characteristics of the optical fibers 24*a* and 24*b*. By positioning using the passive method, the mounts 28*a* to 28*c* can be positioned easily and in a short period of time merely by directly contacting the predetermined directly contacting faces and the like, enabling positioning workability to be improved and reducing the assembly time of the optical module 30, and the like.

Although it is important to maintain the precision of the relative positional relationship between the optical fiber insertion holes 31 and the fitting pin holes 34 in the optical module 30, providing the optical fiber insertion holes 31 and the fitting pin holes 34 parallel to each other is effective in maintaining precision, and can easily achieve high precision.

For example, to mold the resin package 33 comprising plastic and the like in a metal cast, as shown in FIGS. 20A and 20B, round rod-like slide core pins 31*a* for molding the optical fiber insertion holes 31 and slide core pins 34*a* for molding the fitting pin holes 34 need only be pulled out in the same direction from the package side wall 32 (comprising the protrusion 36). Since the slide core pins 34*a*, which are positioned in predetermined positions with respect to the slide core pins 31*a*, remain sufficiently parallel, the optical elements 3*a* and 3*b* and the fitting pin holes 34 can easily be provided parallel to each other with high precision. More than in the case of, for example, the relationship between the positioning grooves and the fitting pin holes in the second embodiment, where relative precision needed to be maintained between the metal casts in a plurality of different directions, a highly precise relative positional relationship can easily be obtained between the optical fiber insertion holes 31 and the fitting pin holes 34. The central axes of the fitting pin holes 34 become the references for the positional deviation of the provided optical fiber insertion holes 31, and on the line which joins the central axes of the fitting pin holes 34, the positional deviation from the predetermined positions of the optical fiber insertion holes 31, which are precisely positioned on both sides centered around the bisector, is measured.

Trial results showed that positional precision can also be maintained when single mode optical fibers can be butt-connected between the optical module 30 and the optical connector 10A.

Incidentally, the grooves 38 are insertion grooves of a positioning plate (not shown in the diagram) which abuts to the slide core pins 31*a* and 34*a*. When the slide core pins 31*a* and 34*a* are pulled out from the state of abutting to this positioning plate by a pulling out operation, the optical fiber insertion holes 31 and the fitting pin holes 34 are formed.

On the other hand, the positioning grooves 37*a* and 37*b* on the positioning stand 37 are formed by metal casts in the same direction as the protruding walls 33*a*, 33*h*, 33*k*, and the like, inside the package 33. As shown in FIG. 21, protruding walls 33*a*, 33*h*, 33*k*, and the like, inside the package 33 are provided in the up-down direction of FIG. 21 by metal casts (not shown in the diagram). Since the positioning stand 37 can also be considered a protruding wall inside the package 33, it can be provided in a single body with the package 33 by using the same metal casts and same directional metal casts as for the protruding walls 33a, 33h, 33k, and the like, inside the package 33. The relative positional relationship is easily maintained when identical metal casts, and metal casts which remove or set in a single direction, are used. It is easy to maintain high precision of the precision of the positional relationship between the protruding walls 33a, 33h, 33k, and the like which are formed in this way and the positioning grooves 37a and 37b. The positioning of the optical elements 3a and 3b in the package 33 is performed by directly contacting the mounts 28a to 28c to directly contacting faces provided on the protruding walls 33a, 33h, 33k, and the like, inside the package 33. Therefore, by maintaining the precision of the relative positional relationship between the directly contacting faces provided on the protruding walls 33a, 33h, 33k, and the like, and the positioning grooves 37a and 37b, it is possible to maintain the high precision of the position precision of the optical fibers 24a and 24b, which have been pressed into the positioning grooves 37a and 37b and position-centered, with respect to the optical elements 3a and 3b.

That is, according to this optical module 30, by maintaining the precision of the relative positional relationship between the fitting pin holes 34 and the optical fiber insertion holes 31, the positioning precision between the optical fibers 9a and 9b on the optical connector 10A side and the optical fibers 24a and 24b on the optical fiber insertion holes 31 side can be maintained, and, by maintaining the precision of the relative positional relationship between the positioning grooves 37a and 37b and the directly contacting faces for positioning of the mounts 28a to 28c inside the package 33, the optical fibers 24a and 24b which are positioned in the positioning grooves 37a and 37b can be precisely positioned with respect to optical elements 3a and 3b. Consequently, the optical fibers 24a and 24b which have been positioned by being inserted through the optical fiber insertion holes 31 are accurately positioned in the desired positions with respect to the optical elements 3a and 3b. In addition, the positioning precision of the optical connector 10A with respect to the optical fibers 9a and 9b can be maintained. Even when one or both of the optical fibers 24a and 24b is a single mode optical fiber, the butt-connection of the optical connector 10A side to the optical fibers 9a and 9b, and the positioning with respect to the optical elements 3a and 3b, can both easily be achieved.

The directions of the metal casts for molding differ between the optical fiber insertion holes 31 and the positioning grooves 37a and 37b, and the metal casts are separate bodies. For these reasons, there is a possibility that slight (e.g. approximately several μm) positional deviation will occur between the centering axes of both metal casts. However, in this optical module 30, since the optical fibers 24a and 24b are not restricted in the groove between the package side wall 32 and the positioning stand 37, the deviation of the centering axes can be absorbed by permitting a small amount of bending here. Consequently, there are no drawbacks such as damaging the optical fibers 24a and 24b. Since the optical elements 3a and 3b is provided with high precision with respect to the positioning grooves 37a and 37b, any deviation of the centering axes between them is extremely slight, making the state of the optical fibers 24a and 24b almost the same as a state of being positioned on the identical centering axes between the optical fiber insertion holes 31 and the positioning grooves 37a and 37b. Therefore, for example, there is no adverse influence such as hindering the operation of inserting the optical fibers 24a and 24b from the optical fiber insertion holes 31 to the positioning grooves 37a and 37b. Furthermore, since the optical fibers 24a and 24b are restricted so that they do not positionally deviate in either direction when inserted through the optical fiber insertion holes 31, until the operation of pressing the optical fibers 24a and 24b which have been inserted into the positioning grooves 37a and 37b by using the pressing member is completed, it is possible to reliably prevent the optical fibers 24a and 24b from rising out from the positioning grooves 37a and 37b, deviating from their positions, and the like, improving the workability of the positioning by pressing operation. Since the restricted state of the optical fibers 24a and 24b by the optical fiber insertion holes 31 continues after the securing by the pressing member is completed, positional deviation, rising up, and the like, are unlikely to occur, whereby the degree of precision of the positioning of the optical fibers 24a and 24b with respect to the optical elements 3a and 3b can be maintained with stability over a long time.

Incidentally, the degree of precision of the positioning of the optical fibers 24a and 24b with respect to the optical elements 3a and 3b does not necessarily signify an intention to improve the optical input/output characteristics between the optical fibers 24a and 24b and the optical elements 3a and 3b. For example, in the case where a semiconductor laser is used as the light-emitting element 3a, the optical power output from the optical module 30 (the light output from the tip of the join end face 36a of the optical fiber 24a) may be deliberately reduced for safety reasons. In a case such as this, inside the package, the directly contacting faces 33c and 33g which directly contact the mount 28a for the light-emitting element 3a are provided so that there is a slight deviation in the centering of the light-emitting element 3a and the optical fiber 24a which faces it, and the mount 28a is positioned with an appropriate centering deviation.

As shown in FIG. 22C, it is more preferable to provide an expanding tapered optical fiber insertion opening 31b at the end of the optical fiber insertion holes 31 which faces the outside of the package 33. This facilitates the operation of inserting the optical fibers 24a and 24b to the completed optical fiber insertion holes 31. The constitution of the optical fiber insertion opening is not limited to that shown in FIG. 22C, and for example, the constitutions shown in FIGS. 23A and 23B are also possible.

Figure 23A:
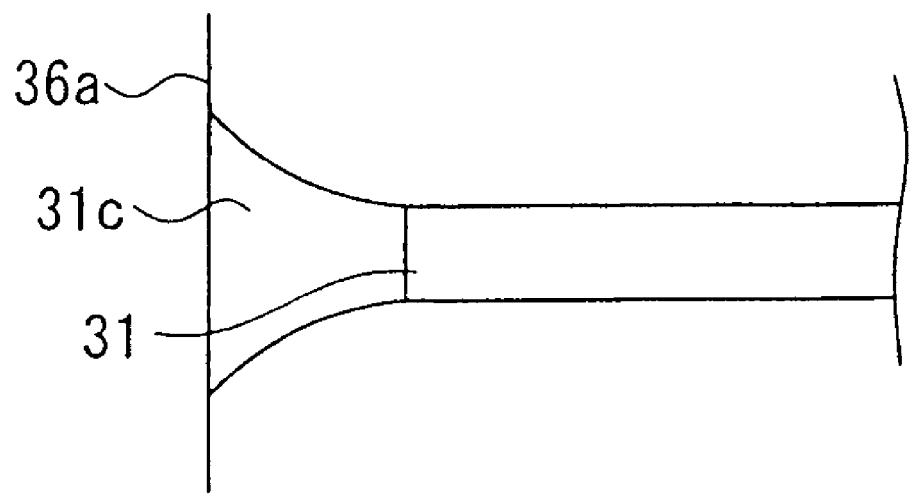
FIG. 23A is a diagram showing another aspect of optical fiber insertion openings used as the optical fiber insertion holes which is applied in the optical module of FIG. 20A, being a cross-sectional view of a trumpet-shaped opening.

The optical fiber insertion opening 31c in FIG. 23A is trumpet-shaped, and enables the optical fiber to be smoothly fed into the optical fiber insertion hole 31.

Figure 23B:
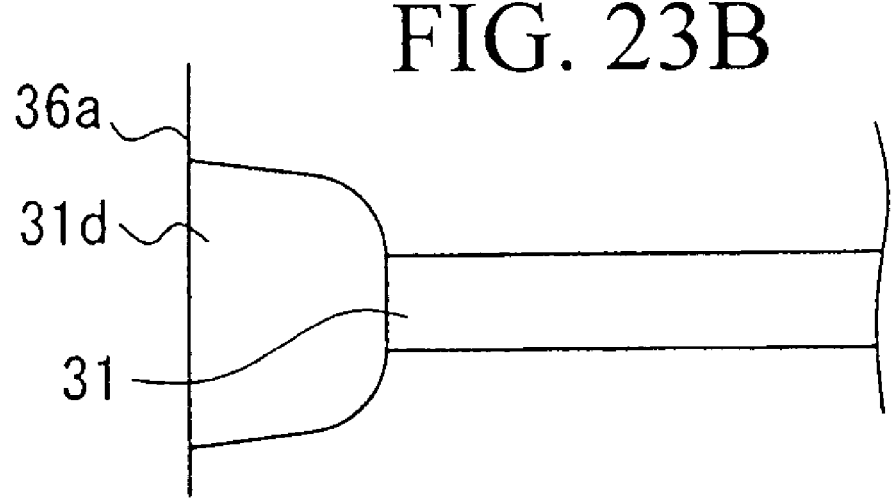
FIG. 23B shows the same other aspect of the optical fiber insertion opening, being a cross-sectional view of a large hole-like shape wherein the diameter abruptly decreases a slight distance from the join side face.

The optical fiber insertion opening 31d in FIG. 23B is tapered so that the diameter abruptly decreases a slight distance from the join end face 36a. Near the join end face 36a, a round hole has a larger diameter than the optical fiber insertion hole 31. In this optical fiber insertion opening 31d, even when the insertion direction of the optical fiber into the optical fiber insertion hole 31 has deviated greatly, the optical fiber need only enter the optical fiber insertion opening 31d and directly contact the inner faces thereof to enable it to be led completely into the optical fiber insertion hole 31 without flying out of the optical fiber insertion opening 31d.

These optical fiber insertion openings 31b, 31c, and 31d, can easily be molded by the flange sections protruding in the slide core pins 31a.

According to the abovementioned optical module 30, the constitution is one wherein the optical fiber insertion holes 31 and the optical fiber insertion holes 31 are provided parallel to each other in the package side wall 32 (comprising the protrusions 36). Therefore, in making the package 33 by metal cast molding and the like of resin, the parallel between the optical fiber insertion holes 31 and the fitting pin holes 34 can be maintained with a high degree of precision. When the external optical connector 10A (see FIGS. 19A and 19B) is butt-connected to the protrusion 36, the positioning precision obtained by inserting and fitting the fitting pins 10a into the fitting pin holes 34 positions the optical fibers 9a and 9b of the optical connector 10A side with respect to the optical fibers 24a and 24b of the optical module 30 side with high precision, thereby accurately butt-connecting them.

It is possible to maintain the precision of the optical fibers 24a and 24b with respect to the optical elements 3a and 3b with the optical fiber insertion holes 31 holes, but by using the positioning stand 37 comprising the positioning grooves 37a and 37b, higher precision can be achieved easily and reliably. Further, by using the positioning stand 37, even in the case where the positions of the optical elements 3a and 3b inside the package 33 are far from the optical fiber insertion holes 31, superior centering precision can be obtained. Moreover, the pressing by the pressing member prevents positional deviation of the optical fibers 24a and 24b, and stable precision can be maintain.

Furthermore, the positioning of the optical fibers 24a and 24b by the perfectly circular optical fiber insertion holes 31 obtains an advantage that core deviation is unlikely to occur in any direction. As a result, since the positioning precision of the optical fibers 24a and 24b is maintained with stability, there is no likelihood of positional deviation when used over a long period, and decrease of the light-receiving efficiency and the transmission efficiency resulting from positional deviation the optical elements 3a and 3b and the optical fibers 24a and 24b can be prevented.

Incidentally, the shape of the package and the type of optical elements and the like provided therein can of course be changed in a variety of ways in this embodiment also.

There may be one or three or more optical elements. For example, when a mount carrying a plurality of light-emitting elements or a plurality of light-receiving elements (carrying LD array and PD array) is used, the optical fiber insertion holes must be provided in correspondence with the number of optical elements. In the case of a mount carrying a plurality of optical elements, the plurality of optical elements can be positioned in the package in a single operation. When using a positioning stand having positioning grooves, the shape of the positioning stand and the number and the like of the positioning grooves thereon are of course adjusted in accordance with the number of optical elements and the optical fiber insertion holes.

The formation of the optical fiber insertion holes and fitting pin holes is not limited to metal casts. For example, they can be formed precisely by using laser beam processing and the like. In this case also, the positioning of the laser beam for processing need only be adjusted at one of XYZ, ultimately enabling the relative positional relationship between the fitting pin holes and the optical fiber insertion holes to be precisely maintained.

(An Optical Fiber Insertion Piece)

As in the optical module 30, in an optical module comprising fitting pin holes and optical fiber insertion holes provided parallel in the package side wall, the optical fibers which are positioned with respect to the optical elements and contained inside the package are normally inserted from the optical fiber insertion holes. Accordingly, an optical fiber insertion piece has been developed to increase the efficiency of the insertion of the optical fibers into the optical fiber insertion holes.

An optical fiber insertion piece 140 used in the optical module 30 will be explained with reference to FIGS. 25A to 26A.

Figure 25A:
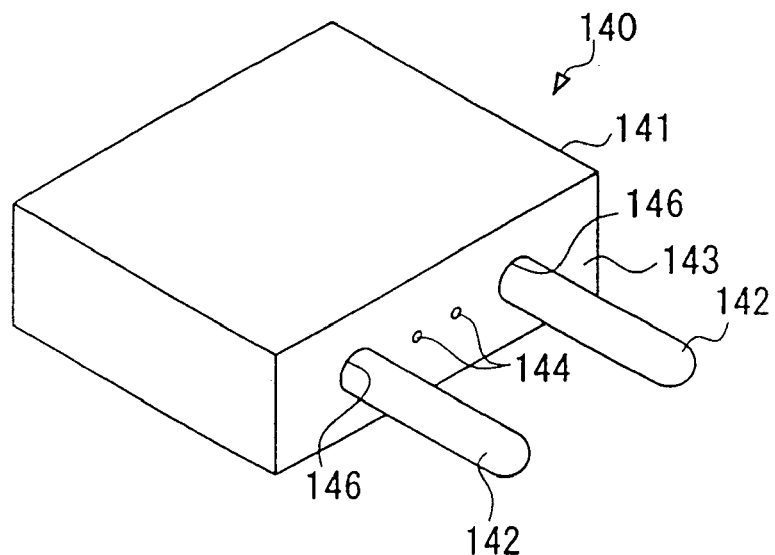
FIG. 25A is a perspective view of an optical fiber insertion piece of this invention.
Figure 25B:
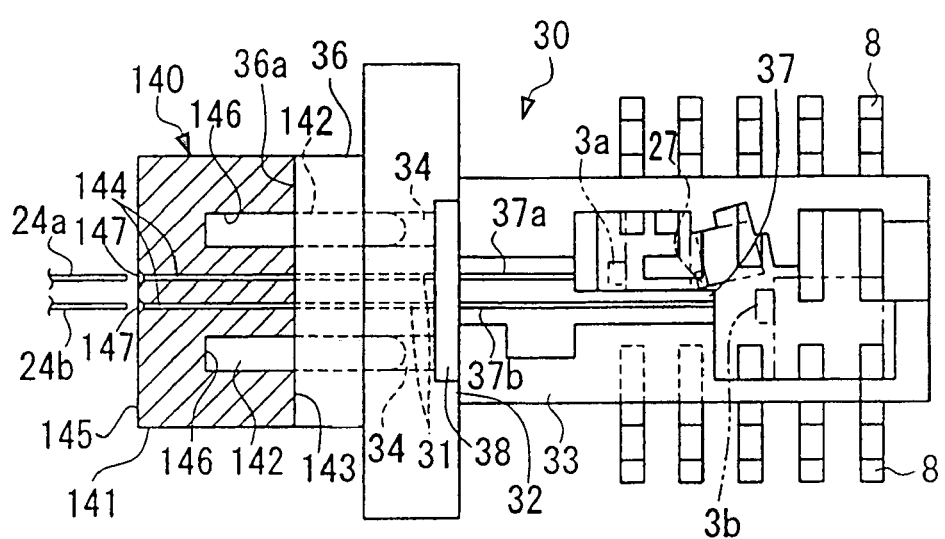
FIG. 25B is a plan view of an optical fiber insertion operation using the same piece.

FIG. 25A is a perspective view of an optical fiber insertion piece 140, and FIG. 25B is a plan view of an insertion operation of the optical fibers 24a and 24b using the optical fiber insertion piece 140.

As shown in FIGS. 25A and 25B, the optical fiber insertion piece 140 comprises fitting pins 142 incorporated in a block-like piece main body 141. The fitting pins 142 protrude from opposite sides of a flat directly contacting face 143 provided on one side of the piece main body 141. Optical fiber insertion holes 144 are provided in the center of the directly contacting face 143 between the fitting pins 142, and pass through the piece main body 141. The optical fiber insertion holes 144 should preferably be perfect cross-sectional circles having the same diameter as the optical fiber insertion holes 31, and extend from the directly contacting face 143 linearly to a work face 145 on the opposite side thereto. For example, to insert optical fibers having a diameter of 125 µm, the optical fiber insertion holes 144 should preferably be made perfect circles having a diameter of approximately 126 µm, as do the optical fiber insertion holes 31 on the package 33 side.

In this optical fiber insertion piece 140, two optical fiber insertion holes 144 are provided in the piece main body 141 in correspondence with the two optical fiber insertion holes 31 in the package side wall 32. When the piece 140 has directly contacted the join end face 36a of the package side wall 32 side, the optical fiber insertion holes 144 must continuously join with the optical fiber insertion holes 31 on the package side wall 32. In order to achieve the continuous join between the optical fiber insertion holes 31 and 144, the distance separating the optical fiber insertion holes 144 on the piece 40 side should, of course, precisely match the distance separating the optical fiber insertion holes 31 on the package 33 side.

On the other hand, the two fitting pins 142 which protrude from the directly contacting face 143 are inserted and fitted into the pair of fitting pin holes 34 in the package side wall 32, and thereby perform the function of precisely positioning the optical fiber insertion holes 144 in correspondence with the two optical fiber insertion holes 31 in the package side wall 32. Therefore, the positions of these fitting pins 142 on the piece main body 141 must also be precisely axis-aligned with the fitting pin holes 34. When the fitting pins 142 are inserted and fitted in the fitting pin holes 34, and the directly contacting face 143 of the piece main body 141 directly contacts the join end face 36a of the package side wall 32 side, the optical fiber insertion holes 144 and 31 on the piece 40 and package 33 sides are continuously joined. Here, when the optical fibers 24a and 24b are inserted from the work face 145 of the piece 40 into the optical fiber insertion holes 144, the optical fibers 24a and 24b communications apparatuses be inserted into the optical fiber insertion holes 31 of the package 33 side via these optical fiber insertion holes 144.

A variety of material can be used as the material for the piece main body 141.

(a) Ceramic, zirconia, alumina, and the like, have high hardness and can easily obtain surfaces with low sliding resistance to optical fibers (naked fibers). For these reasons, they have an advantage of enabling the operation of inserting the optical fibers through the optical fiber insertion holes 144 to the optical fiber insertion holes 31 in the package side wall 32 smoothly.

(b) Glass, quartz glass, and the like have superior processing characteristics, and consequently have an advantage that the flat directly contacting face 143, the optical fiber insertion holes 144, and the like can be formed with high precision. Furthermore, for example, in order to facilitate the insertion of the optical fibers into the optical fiber insertion holes 144, processing, such as tapering the ends of the work face 145 optical fiber insertion holes 144 on the work face 145 side, can be carried out easily.

(c) Various metallic materials also have superior processing characteristics, and consequently obtain an advantage that the flat directly contacting face 143, the optical fiber insertion holes 144, and the like can be formed with high precision.

(d) Resin materials such as plastic can be processed easily and inexpensively, and consequently have an advantage of reducing costs. Furthermore, there is an advantage that there is not worry of damaging the join end face 36*a* and the like when directly contacting the package 33 comprising a resin such as plastic.

The fitting pins 142 are secured by adhesive or the like in fitting pin holes 146, provided in the piece main body 141, to prevent them from becoming removed from the piece main body 141 during the operation of pulling out from the fitting pin holes 34 on the package 33 side.

The optical fiber insertion holes 144 and the fitting pin holes 46 in the piece main body 141 must, as already mentioned above, precisely match the positions of the optical fiber insertion holes 31 and fitting pin holes 34 provided in the package side wall 32. For example, in a piece main body 141 comprising a resin such as plastic, the slide core pins 31*a* and 34*a* for molding the optical fiber insertion holes 31 and the fitting pin holes 34 of the package side wall 32 (see FIG. 20A) can be used unchanged to achieve high precision. Furthermore, since the optical fiber insertion holes 144 and the fitting pin holes 46 are parallel to each other, as are the optical fiber insertion holes 31 and the fitting pin holes 34 in the package side wall 32, in resin molding by using, metal casts, a they can be kept parallel by pulling out the pins in one direction in the same way as the case of the slide core pins 31*a* and 34*a*.

Tapered optical fiber insertion openings are provided at the ends of the work face 145 of the optical fiber insertion holes 144. Consequently, the operation of inserting the optical fibers 24*a* and 24*b* into the optical fiber insertion holes 144 can easily be performed from the optical fiber insertion openings 147.

Figure 26A:
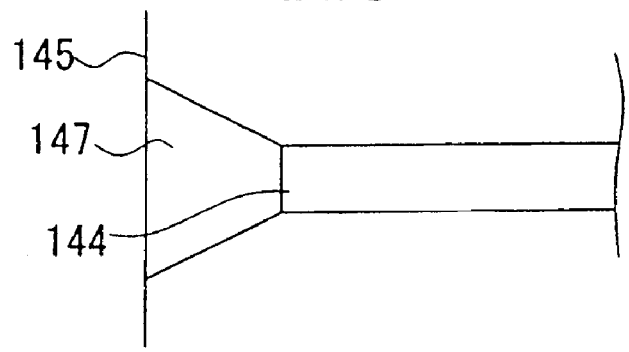
FIG. 26A is a diagram showing the shape of an optical fiber insertion opening used as the optical fiber insertion hole which is applied in the optical fiber insertion piece of FIG. 25A, being a cross-sectional view of a tapered hole opened in a tapered shape at a fixed open angle.

FIG. 26A is an enlarged view of the vicinity of the optical fiber insertion opening 147.

In FIG. 26A, the optical fiber insertion opening 147 comprises a tapered expanding section having an inner face at a gradient angle of $\theta=1$ to $85°$ with respect to the center axis of the optical fiber insertion holes 144. In contrast to the optical fiber insertion holes 144 having a diameter of 126 μm (which optical fibers having a diameter of 125 μm are inserted into), the diameter of the opening in the optical fiber insertion opening 147 in the work face 145 should preferably be between 130 and 1000 μm. In this range, the optical fiber can be inserted smoothly.

Figure 26B:
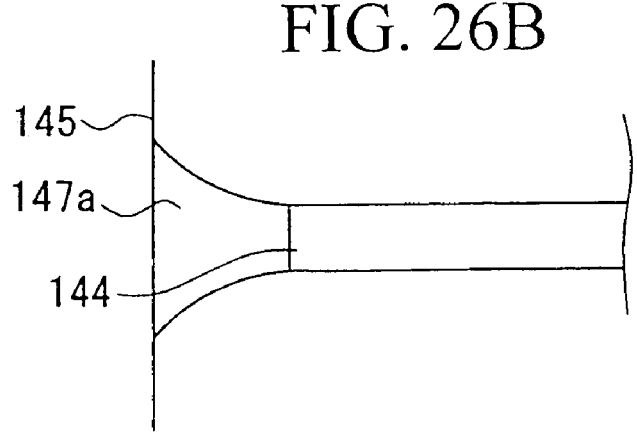
FIG. 26B is a cross-sectional view of the same optical fiber insertion opening comprising a trumpet-shape.
Figure 26C:
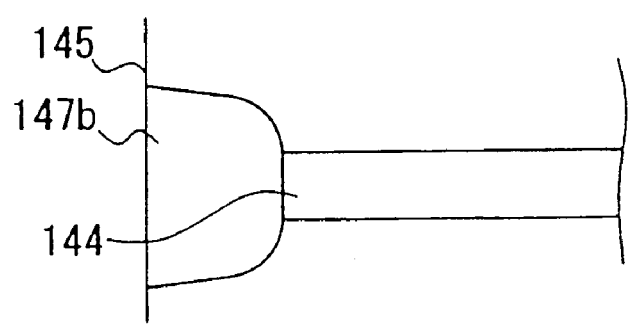
FIG. 26C is a cross-sectional view of the same optical fiber insertion opening comprising a large hole-like shape wherein the diameter abruptly decreases a slight distance from the join side face.

The constitution of the optical fiber insertion opening is not limited to that shown in FIG. 26A and, for example, the constitutions shown in FIGS. 26B and 26C can be used.

The optical fiber insertion opening 147*a* in FIG. 26B is trumpet-shaped, and enables the optical fiber to be smoothly fed into the optical fiber insertion hole 144.

The optical fiber insertion opening 147*b* in FIG. 26C is tapered so that the diameter abruptly decreases a slight distance from the join end face 145. Near the join end face 145, a round hole has a larger diameter than the optical fiber insertion hole 144. In this optical fiber insertion opening 147*b*, even when the insertion direction of the optical fiber into the optical fiber insertion hole 144 has deviated greatly, the optical fiber need only enter the optical fiber insertion opening 147*b* and directly contact the inner faces thereof to enable it to be led completely into the optical fiber insertion hole 144 without flying out of the optical fiber insertion opening 147*b*.

As shown in FIG. 25B, in inserting the optical fibers 24*a* and 24*b* into the optical fiber insertion holes 31 in the package side wall 32 by using this optical fiber insertion piece 40, firstly, the fitting pins 142 are inserted and fitted into the fitting pin holes 34 in the package side wall 32, and the piece 40 is pressed further against the package side wall 32 side so that the directly contacting face 143 directly contacts the join end face 36*a*. As a result, the fitting between the fitting pins 142 and the fitting pin holes 34 maintains positioning precision, whereby the optical fiber insertion holes 144 of the piece 40 and the optical fiber insertion holes 31 of the optical elements 3*a* and 3*b* are positioned precisely and continuously joined. Consequently, the optical fibers 24*a* and 24*b* which are inserted from the work face 145 into the optical fiber insertion holes 144 are pressed toward the package 33, and the optical fibers 24*a* and 24*b* can be inserted through the optical fiber insertion holes 144 into the optical fiber insertion holes 31 in the package 33. By pressing the optical fibers 24*a* and 24*b* having predetermined lengths, finally, the tips thereof can reach the desired positions in the vicinity of the optical elements 3*a* and 3*b*.

The polishing of the join end face 36*a* of the package 33, in consideration of the butt-connection of the optical fibers 9*a* and 9*b* on the optical connector 10A side, is carried out after removing the piece 40 when the optical fibers 24*a* and 24*b* have been completely inserted by using the piece 40.

In the operation of inserting the optical fibers 24*a* and 24*b* by using the optical fiber insertion piece 40 the optical fiber insertion openings 147, 147*a*, and 147*b*, provided by processing the piece main body 141, enable the insertion workability of the optical fibers 24*a* and 24*b* into the very small optical fiber insertion holes 31 to be achieved. As a consequence, there is no need to provide chamfered sections or the like at the entrances of the optical fiber insertion holes 31 in the package 33, enabling the structure of the package side wall 32 to be simplified and improving the molding. By simplifying the structure, the resin molding of the package 33 by using metal casts and the like can be performed simply, reducing the manufacturing costs and increasing the manufacturing performance. Moreover, the improved molding enables precision of the optical fiber insertion holes 31 and fitting pin holes 34 on the package 33 side and the precision of the relative positional relationship therebetween to be made more stable and more precise.

Furthermore, since chamfered sections and the like do not need to be provided at the entrances of the optical fiber insertion holes 31 in the package 33, the problem of poor polishing workability which occurs when chamfered sections and the like are provided is eliminated. This obtains advantages that the join end face 36*a* with few dips and bumps can be efficiently polished, and the workability of the polishing can be increased.

The number of optical fiber insertion holes 144 provided in the piece main body 141 is two, matching the optical fiber insertion holes 31 in the package 33, but optical fiber insertion holes may be provided in other positions in the piece main body, making it possible to accommodate optical modules of various dimensions.

A constitution of optical fiber insertion holes which are tapered at the ends has been described as a constitution which makes it easy to insert the optical fibers into the optical fiber insertion holes 144 of the piece 140. However, the constitution is not limited to this. For example, a piece having funnel-shaped optical fiber insertion holes can be provided at the optical fiber insertion hole ends, and the like. In any constitution, since it is applied not to the package side but to the piece side, package side processing and the like can be avoided as much as possible.

Furthermore, the above example describes a case where the fitting pins 142 are affixed in the fitting pin holes 146 which do not pass through the piece main body 141, but the method for securing the fitting pins is not limited to this. For example, a constitution can be applied wherein the fitting pins are inserted in fitting pin holes which pass through the piece main body, and stopped from escaping by using a stopping member.

Incidentally, the package shape of the optical module which this piece is applied in, the type of optical elements contained in the package, the position of the arrangement inside the package, and the like, can of course be changed.

(Sealing the Optical Elements)

Figure 27:
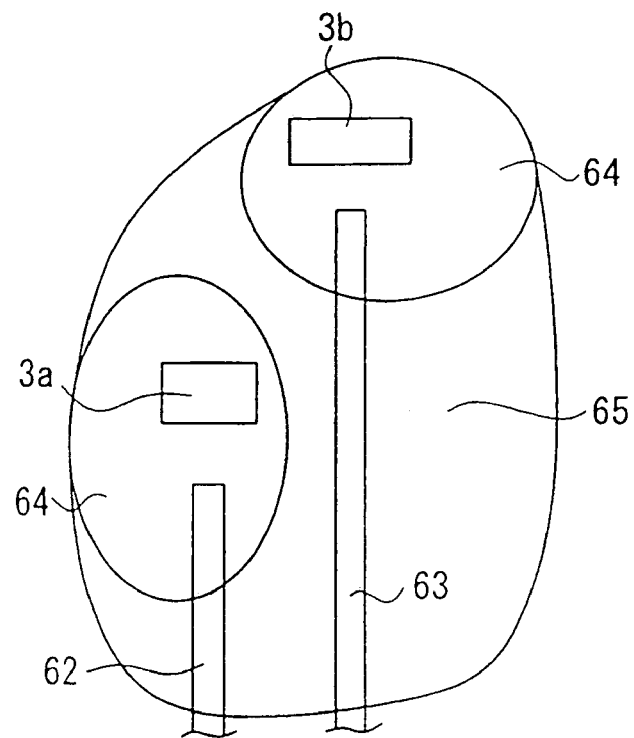
FIG. 27 is a plan view of a sealing structure in the vicinity of the light-emitting/light-receiving sections of the optical module according to this invention.
Figure 28:
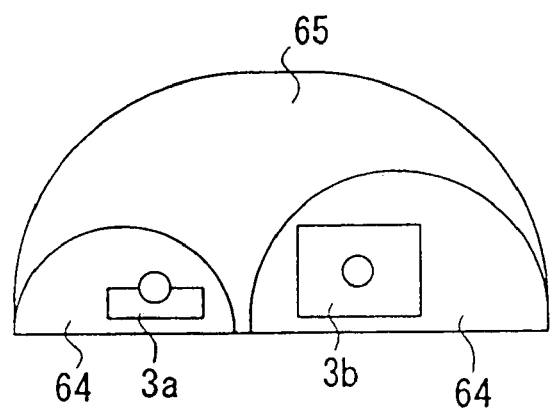
FIG. 28 is a cross-sectional view of the sealing structure of FIG. 27.

When the optical elements 3a and 3b which have been completely incorporated in the optical module are sealed with resin, resin for sealing is injected and the like so as to include the tips of the optical fibers positioned with respect to the optical elements 3a and 3b. In the optical module, according to the internal design, mounts and protruding walls and the like are provided between the optical elements. Therefore, countermeasures to prevent crosstalk and the like are implemented. For example, the light output from the light-emitting element 3a is cut-off so as not to be directly radiated to the light-receiving element 3b. Preferably, light scattered by reflection is reliably prevented from radiating into the light-receiving element 3b. FIGS. 27 and 28 show methods for preventing scattered light from being radiated to the light-receiving element 3b. These methods can be applied in any of the embodiments.

FIG. 27 is a plan view of a sealing structure in the vicinity of the light-emitting/light-receiving sections of the optical module according to an embodiment of this invention, and FIG. 28 is a cross-sectional view of the sealing structure.

Light-permeable materials 64 are filled individually between the optical fiber 62 and the light-emitting element 3a which comprises a semiconductor laser (LD) or the like, and between the optical fiber 63 and the light-receiving element 3b which comprises a photodiode (PD) or the like. The light-permeable materials 64 are covered by a light-absorbent material 65, sealing the entire structure.

The light-permeable materials 64 allow light output from the light-emitting element 3a to pass without being absorbed, increasing the coupling efficiency between the optical fiber 62 and the light-emitting element 3a and the coupling efficiency between the optical fiber 63 and the light-receiving element 3b. A light-permeable organic polymeric material having a larger refractive index than air, and having, for example, a refractive index of approximately 1.3 to 1.5 which is near the refractive indexes of the optical fibers 62 and 63 (refractive index of quartz glass: 1.45), and low hardness (i.e. is pliable) after hardening, such as a gel-like silicone resin, and a transformable acrylate-type resin, may acceptably be used.

The light-absorbent material 65 efficiently absorbs the light output from the light-emitting element 3a, comprising laser light in a long waveband, in order to prevent scattered light from the light-emitting element 3a from entering the light-receiving element 3b. An organic polymeric material having high absorbency of long waveband laser light, for example, cold hardening type, thermal hardening type, or ultraviolet rays (UV) hardening type epoxy resin, comprising black resin having superior moisture tolerance characteristics, is acceptable for use as the light-absorbent material 65.

Next, the resin sealing method will be explained.

Firstly, liquid light-permeable material is filled between the optical fiber 62 and the light-emitting element 3a, and between the optical fiber 63 and the light-receiving element 3b. This is hardened by heating at a predetermined temperature, or by UV radiation, to provide the gel-like light-permeable materials 64.

In the case of silicone resin, thermal hardening is used, the hardening conditions being, for example, 30 minutes to one hour at 110 to 150° C.

Furthermore, in the case of transformable acrylate resin, UV radiation hardening is used, the hardening conditions being, for example, 30 seconds to one minute at 100 to 200 mW/cm$^2$.

Subsequently, a coating of liquid or gel-like light absorbent material is applied so as to entirely cover the light-permeable materials 64 and 64, hardened in accordance with predetermined hardening conditions, to form the gel-like or solid light-absorbent material 65.

The hardening conditions in the case of epoxy-type hardening resin were 30 minutes to one hour at 80 to 100° C.

According to the above, resin sealing between the optical fiber 62 and the light-emitting element 3a, and between the optical fiber 63 and the light-receiving element 3b, can be achieved by using the light-permeable materials 64 and the light-absorbent material 65.

In this optical module, resin sealing between the optical fiber 62 and the light-emitting element 3a, and between the optical fiber 63 and the light-receiving element 3b, is achieved by using the light-permeable materials 64 and the light-absorbent material 65. Therefore, after some of the light radiated from the light-emitting element 3a has become scattered light and passed through the light-permeable materials 64, it is absorbed by the light-absorbent material 65, with the result that no light seeps outside the light-absorbent material 65. Therefore, since the scattered light from the light-emitting element 3a is absorbed by the light-absorbent material 65, seepage to the outside can be prevented.

Furthermore, in the case where light is radiated to the light-receiving element 3b from the outside, this radiated light is absorbed by the light-absorbent material 65 and does not enter the light-receiving element 3b.

According to this optical module, a light-permeable material 64 is filled individually between the optical fiber 62 and the light-emitting element 3a, and between the optical fiber 63 and the light-receiving element 3b. These light-permeable materials 64 and 64 are sealed by being entirely covered by the light-absorbent material 65. Scattered light from the light-emitting element 3a is absorbed by the light-absorbent material 65, preventing seepage to the outside.

Furthermore, when light has been radiated to the light-receiving element 3b from the outside, this radiated light is absorbed by the light-absorbent material 65, enabling the radiation to the light-receiving element 3b to be prevented, and improving the crosstalk characteristics of the light-receiving element 3b.

According to the above, even when the light-emitting element 3a and the light-receiving element 3b are provided close together, scattered light from the light-emitting element 3a can be prevented from radiating-into the light-receiving element 3b, and the crosstalk characteristics of the light-receiving element 3b can be improved.

Furthermore, the constitution is not limited to that described above. For example, in the package which has no likelihood of radiation of outside light and the like to the optical fiber 62 on the light-emitting element 3a side, even when only the light-permeable material 64 on the light-receiving element 3b is covered by the light-absorbent material 65, the crosstalk characteristics of the light-receiving element 3b can similarly be improved. The amount of filling of the light-absorbent material 65 and the shape after filling, the shape of the light-absorbent material 65, and the like can be changed as appropriate in accordance with the shape, size and the like of the light-emitting element 3a and the light-receiving element 3b.

As described above, when at least one of the light-emitting element and the light-receiving element is sealed by the light-absorbent material, scattered light from said optical element is absorbed by the light-absorbent material and prevented from seeping to the outside. Furthermore, when light from the outside has radiated into the light-receiving element, this radiated light can be absorbed by the light-absorbent material and prevented from radiated into the light-receiving element, improving crosstalk characteristics of the light-receiving element. Consequently, even when the light-emitting element 3a and the light-receiving element 3b are provided close together, scattered light from the light-emitting element can be prevented from radiating into the light-receiving element, and the crosstalk characteristics of the light-receiving element can be improved.

(Receptacle-Fitted Optical Module)

As described in the above embodiments, in the optical module according to this invention, in addition to the positional precision of the optical elements and optical fibers in the package, the positional precision of the optical connector section with respect to the outside optical connector, that is, the positioning precision between the optical fiber on the outside optical connector side and the optical fibers inside the package, is also important. In view of this, the connection between this optical module and the outside optical connector should preferably comprise a connection structure which connects a receptacle secured to the optical module and the optical connector plug containing the outside optical connector. Here, for the optical module, the positioning precision with respect to the receptacle and the stability of the secured state should preferably be maintained. A constitution (second aspect) for achieving is shown below. Incidentally, the optical modules described in the following embodiments belong to the optical module of this invention. That is, it contains optical elements which are positioned by a passive method by means of positioning grooves inside the package. The sections which protrude to both sides from the package side wall section 121a of the optical module 120 in the second embodiment (see FIGS. 15A to 15C), and the sections which protrude to both sides from the package side wall section 32 of the optical module 30 in the third embodiment (see FIGS. 20A to 20C), have the same function as protrusions fitted in grooves 243 of adaptor sections (232, 251) as in the optical module 231 to be explained later. The optical modules 30 and 120 can be incorporated unchanged in the adaptor sections (232, 251).

(First Aspect)

Figure 29:
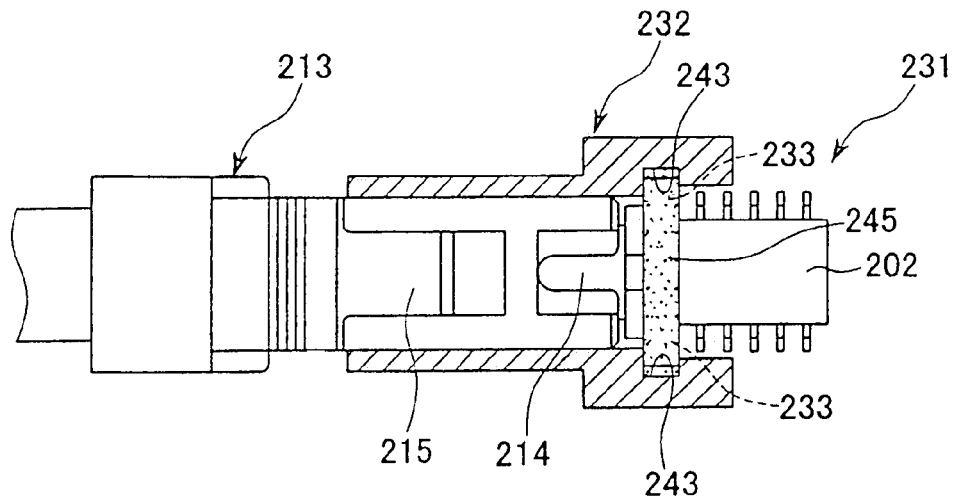
FIG. 29 is a horizontal cross-sectional view of a first aspect of a receptacle-fitted optical module according to this invention.
Figure 30:
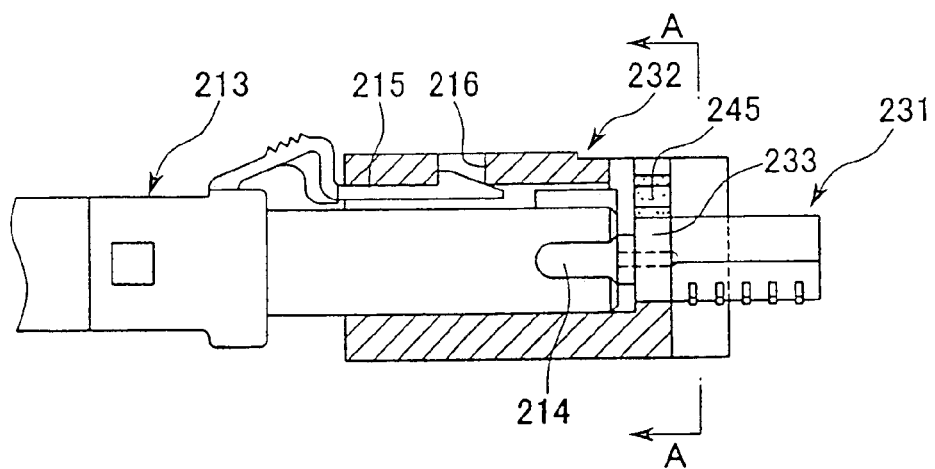
FIG. 30 is a vertical cross-sectional view of the receptacle-fitted optical module of FIG. 29.
Figure 31:
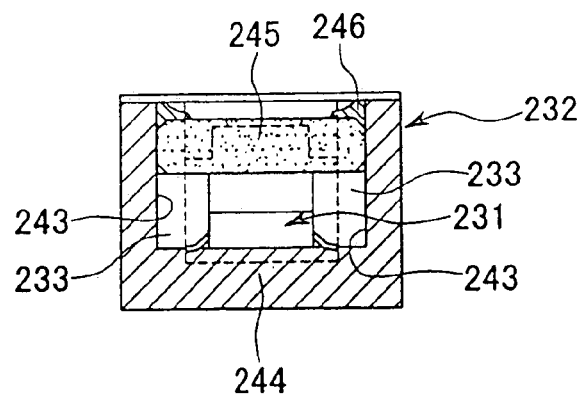
FIG. 31 is a cross-sectional view taken along the line A to A of FIG. 30.

FIG. 29 is a horizontal cross-sectional view of a first aspect of a receptacle-fitted optical module, FIG. 30 is a vertical cross-sectional view of the same, and FIG. 31 is a cross-sectional view taken along the line A to A of FIG. 30. In these diagrams, reference numeral 231 represents a two-core optical module, and reference numeral 232 represents an adaptor section (receptacle) of an optical transceiver which a ferrule 214 of an optical connector plug 213 is contained in.

The optical module 231 is secured to the adaptor section 232 in a state facing the optical connection side of the adaptor section 232. The optical fibers of the optical connector plug 213 and the optical fibers of the optical module 231 are optically connected together in a butt-connected state.

Figure 32A:
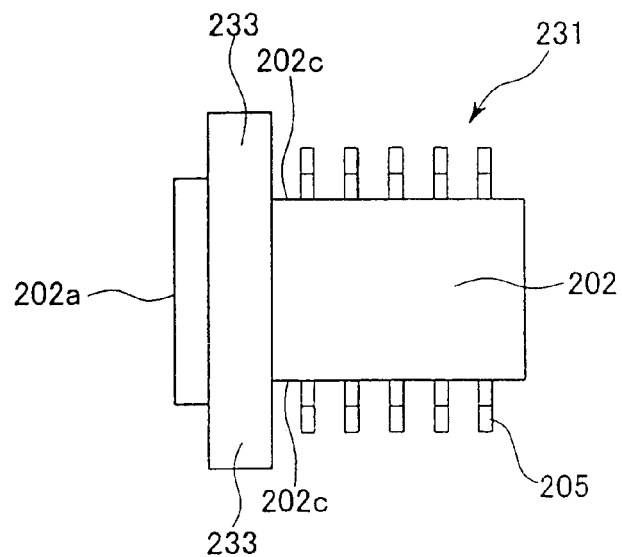
FIG. 32A is a plan view of the optical module of FIG. 29.
Figures 32B, 32C:
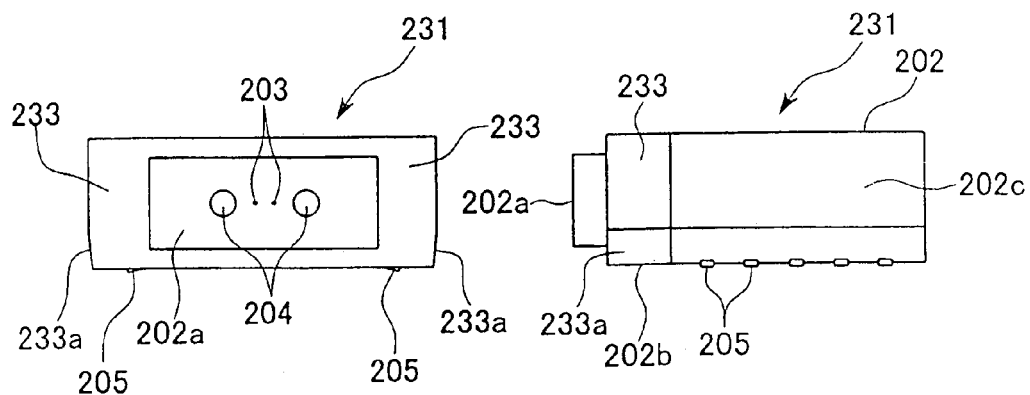
FIG. 32B is a front view of the same.
FIG. 32C is a side view of the same.

As shown in FIGS. 32A to 32C, this optical module 231 comprises optical fibers 203 exposed on one side face 202a of a package 202, which comprises epoxy resin and contains optical elements such as a laser diode (LD) and a photodiode (PD). Holes 204 to insert pins (fitting pins) for positioning an optical connected ferrule are provided on both sides of the optical fibers 203, and a plurality of connection terminals 205, for electrically connecting to external interconnections are provided on the lower face 202b of the package 202.

The ends of both side faces 202c of the side face 202a side of the package 202 comprise protrusions 233 which are rectangular in cross-section and protrude toward the outside. The lower ends of the protrusions 233 comprise tapered sections 233a which slope downward. The protrusions 233 combine the functions of positioning members and securing members.

As the material for comprising this optical module 231, a material having high dimensional precision and sufficient strength, for example, an organic polymeric material such as epoxy resin, ABS resin, polycarbonate resin, liquid crystal line polymer (LCP), polyphenylenesulfide (PPS), polyethersulfone (PES), and Lekisan 3414 Ⓡ and the like, may be used. The strength required by this optical module 231 must be such that warping and the like does not occur even in the case where a compressive force is added which is twice the pressing force generated when fitting to the adaptor section 232, e.g. approximately 1 kg when the connector connection area is 16 mm$^2$.

Figure 33:
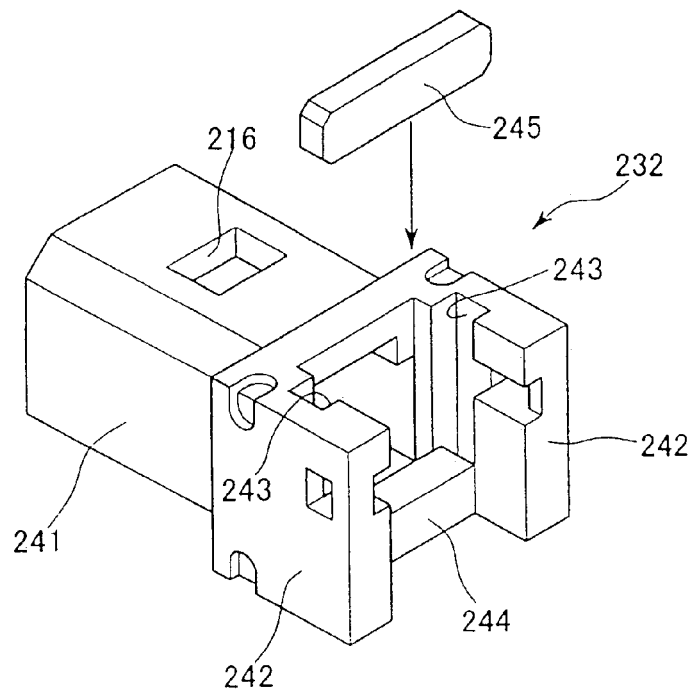
FIG. 33 is a perspective view of an adaptor section of the receptacle-fitted optical module of FIG. 29.

As shown in FIG. 33, the adaptor section 232 comprises an opening 216, which a latch 215 of the optical connector plug 213 clips into by its elastic force, is provided on the top face of an angular tubular housing 241. Both ends of the housing 241 on the optical module 231 side comprise plate sections 242 which extend toward the outside. Grooves 243 extending upward and downward for fitting the protrusions 233 of the optical module 231 are provided at mutually opposite positions on the inner faces of the plate sections 242. An angular column-shape stopper 244 for positioning the optical module 231 is provided at the bottom section of these grooves 243. Like the protrusions 233, these grooves 243 combine the functions of positioning members and securing members.

A rectangular plate-like pressing plate (securing member) 245 comprises a hard rubber and the like having elasticity, and consequently, by fitting the ends thereof into the grooves 243, the elasticity secures the optical module 231 inside the housing 241.

As the material for comprising this adaptor section 232, a material having high dimensional precision and sufficient strength, for example, an organic polymeric material such as epoxy resin, ABS resin, polycarbonate resin, liquid crystal line polymer (LCP), polyphenylenesulfide (PPS), polyethersulfone (PES), and Lekisan 3414 Ⓡ and the like, may be used.

The strength required by this adaptor section 232 must be such that warping and the like does not occur even in the case where a compressive force is added which is twice the pressing force generated when fitting to the adaptor section 232, e.g. approximately 1 kg when the connector connection area is 16 mm².

Figure 35:
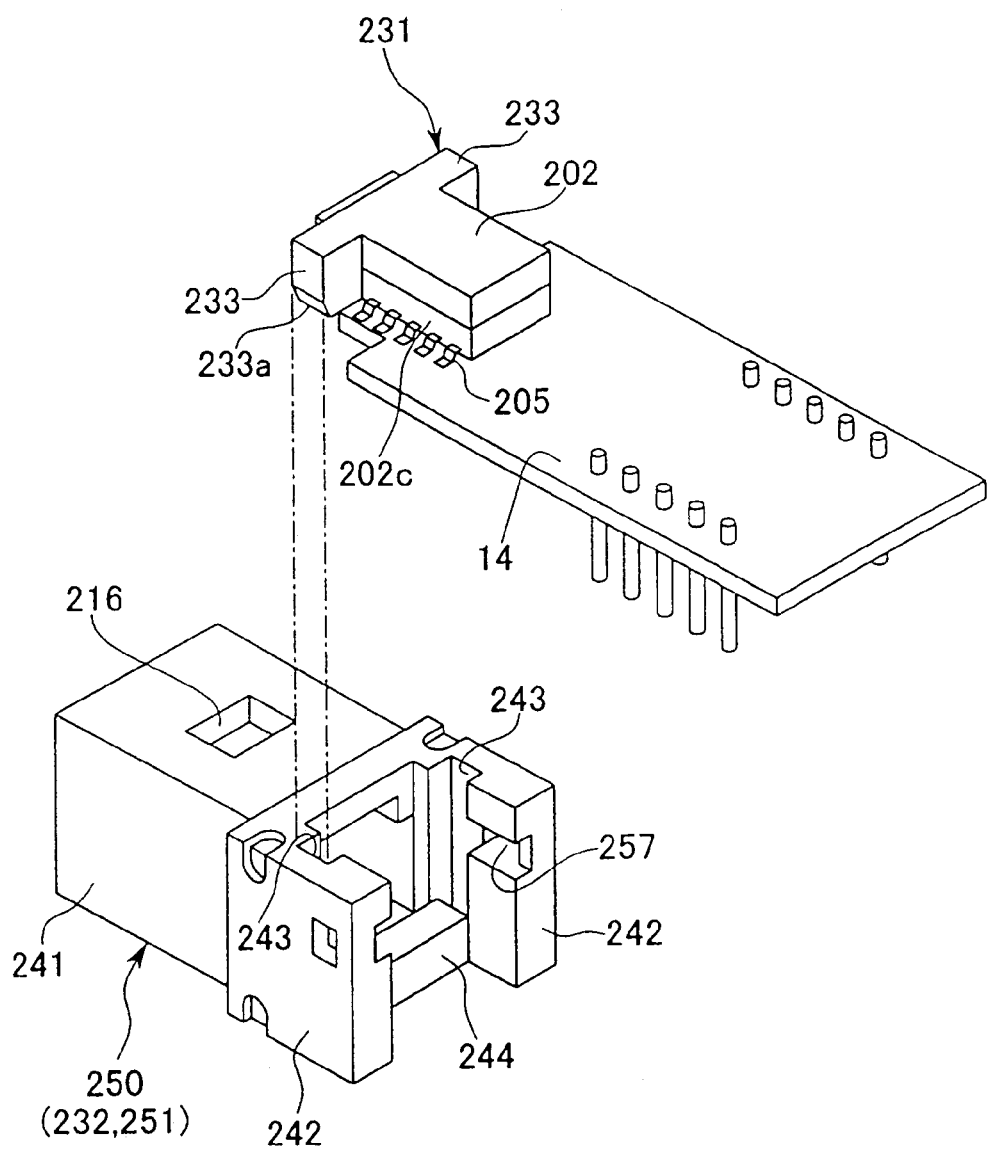
FIG. 35 is an exploded perspective view of an adaptor section in the receptacle-fitted optical module according to this invention, and the optical module incorporated therein.

In assembling this receptacle-fitted optical module, firstly, as shown in FIG. 35, the protrusions 233 of the optical module 231, secured by soldering the connection terminals 205 to an electrical circuit board 14, are inserted from above into the grooves 243 in the adaptor section 232. Thereafter, the optical module 231 is moved downward and the lower face 202b is mounted on the stopper 244. As a result, both sides and the bottom side of the optical module 231 are positioned in predetermined positions inside the housing 241.

Subsequently, as shown in FIG. 33, both ends of the pressing plate 245 are inserted from above into the grooves 243 in the adaptor section 232, and their elasticity presses the optical module 231. Both ends of the pressing plate 245 are secured in the grooves 243 by using an adhesive 246. Consequently, the optical module 231 is firmly secured at top, bottom, left, and right, in the housing 241, making positional deviation impossible. As a result, the optical fibers of the optical connector plug 213 and the optical fibers of the optical module 231 are stabilized in a butt-connected state.

Finally, the ferrule 214 which comprises the tip of the optical connector plug 213 is inserted into the adaptor section 232, and its elasticity clips the latch 215 into the opening 216, whereby the assembly ends.

In this receptacle-fitted optical module, the stress on the optical connector plug 213 when inserting the optical connector plug 213 it transmitted to and supported by the housing 241 via the protrusions 233 of the optical module 231. Therefore, the stress can be prevented from concentrating at a specific section.

Furthermore, when the optical connector plug 213 has twisted up, down, left, and right, since the optical module 231 is firmly secured at top, bottom, left, and right, in the housing 241, there is no likelihood of positional deviation, and the optical fiber are connected in a stable state.

According to the receptacle-fitted optical module of this aspect, protrusions 233 are provided at ends of the side faces 202c of the package 202 of the optical module 231, and grooves 243 for fitting the protrusions 233 are provided in the plate sections 242 of the housing 241 of the adaptor section 232. Moreover, the elasticity of the pressing plate 245 presses the optical module 231 into the housing 241, and consequently, the functions of positioning members and securing members are combined. The positioning precision and join strength of the optical module 231 and the adaptor section 232 can be increased, and there is no likelihood of positional deviation. Therefore, even in the case where a pressing force generated when fitting is added, there is no likelihood of warping, positional deviation, and the like, and the optical fibers can be optically connected with stability.

(Second Aspect)

Figure 34:
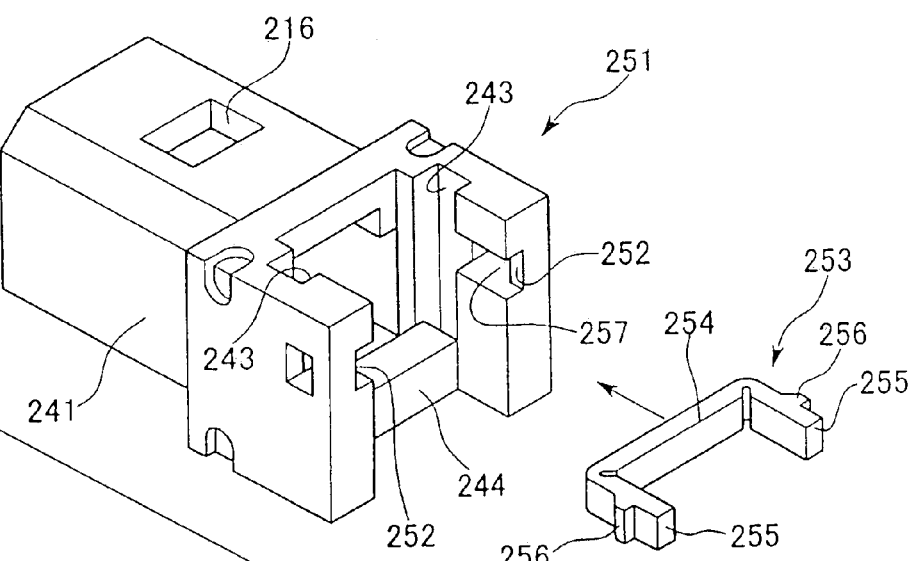
FIG. 34 is a perspective view of a second aspect of the receptacle-fitted optical module according to this invention.

FIG. 34 is a perspective view of a second aspect of the adaptor section (receptacle) according to this invention, and differs from the adaptor section of the first aspect already described above in that, while the adaptor section 232 of the first aspect comprises grooves 243 for fitting the protrusions 233 in the plate sections 242 of the housing 241, the optical module 231 is pressed by the pressing plate 245, and the pressing plate 245 is secured by an adhesive to the adaptor section 232, in the adaptor section 251 of this aspect, fitting concavities 252 are provided at opposing positions to the plate sections 242 of the housing 241, and touching the top of the optical module 231, in a direction intersecting with the grooves 243 and extending to the outside. In addition, a pressing member 253 having elasticity is substantially C-shaped in cross-section, and is fitted into the fitting concavities 252.

The pressing member 253 comprises angular column-shaped pressing pieces 255 extending in directions at a right angle to the ends of an angular column-shaped clamp main body 254, and teeth 256 are provided in the outer centers of the pressing pieces 255 for clipping into the fitting concavities 252. Grooves 257 are provided in the fitting concavities 252 in order to clip the teeth 256 therein.

An organic polymeric material having elasticity and hardness, such as hard rubber, is ideally used as the material for the pressing member 253.

To assemble this receptacle-fitted optical module using the adaptor section 251, firstly, as shown in FIG. 35, the protrusions 233 of the optical module 231, secured by soldering the connection terminals 205 to an electrical circuit board 14, are inserted from above into the grooves 243 in the adaptor section 251. Thereafter, the optical module 231 is moved downward and the lower face 202b is mounted on the stopper 244. Subsequently, as shown in FIG. 34, both ends of the pressing plate 253 are fitted into the fitting concavities 252, and the teeth 256 clip into the grooves 257 of the fitting concavities 252.

In the receptacle-fitted optical module, since the elastic clamp main body 254 is pressed on the top face of the optical module 231, the optical module 231 is firmly secured at top, bottom, left, and right, in the housing 241, making positional deviation and the like impossible.

Further, since the pressing member 253 can easily be attached and extracted, it is easy to replace the optical module 231.

The first and second aspects can be combined. That is, the optical module 231 incorporated in the adaptor section 250 can be secured by using both the pressing plate 245 and the pressing member 253. FIG. 35 shows an adaptor section 250 having a constitution which combines the pressing plate 245 and the pressing member 253. This adaptor section 250 combines the adaptor section 232 applied in the first aspect with the adaptor section 251 applied in the second aspect. Incidentally, in the adaptor sections 232 and 251 shown in FIGS. 33 and 34, only the parts needed to explain the aspects are given reference numerals, but the shapes of the adaptor sections 232 and 251 shown in FIGS. 33 and 34 are uniform with the adaptor section 250 of FIG. 35. Since each of the aspects can be established independently, it is not essential to provide the constitution required only for the adaptor section 251 of the second aspect in the adaptor section 232 of the first aspect, and conversely, it is not essential to provide the constitution required only for the adaptor section 232 of the first aspect in the adaptor section 251 of the second aspect.

The aspects of the receptacle-fitted optical module of this invention have been explained above, but the specific constitution is not limited to any of these aspects, and can be modified within a sphere which does not infringe the main points of the invention.

For example, the shape, number, and position of the grooves 243, the shape and securing position of the pressing plate 245, the shape and fitting position of the pressing member 253, and the like, can be changed as appropriate in accordance with the shape and size of the optical module 231 to be secured.

According to this receptacle-fitted optical module, protrusions are provided in the side faces, or the bottom face, of the optical module, grooves for fitting said protrusions are provided in the receptacle, the protrusions of said optical module are fitted into the grooves in said receptacle, and the optical module is secured to the receptacle by a securing member. Therefore, the positioning precision of the optical module and the receptacle can be increased, and the mechanical strength of the join section between the optical module and the receptacle can be increased, removing the likelihood of positional deviation.

Furthermore, since the structure of the connection section between the optical module and the receptacle becomes a strong one, warping, breakage, and the like do not occur even when a large external force is applied to this connection section.

As a result, the positioning precision of the receptacle and the optical module can be made accurate, whereby there is no likelihood of positional deviation, and the butt-alignment of the optical fibers can be made highly precise. Moreover, it is possible to provide a receptacle-fitted optical module wherein warping, breakage, and the like do not occur even when a large external force is applied thereto.

Incidentally, the ferrule 5 of the optical module of the s embodiment, the package side wall section 121*a* (protruding section 121*c*) of the optical module of the second embodiment, and the adaptor section 32 (particularly the protrusion 36) of the optical module of the third embodiment, all correspond to the optical connector section of Claim 1 in the claims of this invention.

In each of the abovementioned embodiments, the positioning structure in the package positions the mount, but the optical elements can of course directly contact a direct positioning structure to achieve positioning.

The invention claimed is:

1. An optical module comprising:
   optical fibers having protruding portions and tips;
   an optical connector section, for connecting to an outside optical connector, said optical connector section having inserted there into and securing said optical fibers;
   a light-emitting element having a light-emitting face;
   a light-receiving element having a light-receiving face;
   at least two mounts on which are mounted said light-emitting element and said light-receiving element, respectively; and
   a package comprising a plurality of positioning structures each comprising walls, wherein at least one of the positioning structures is an integral part of the package;
   wherein said package accommodates said mounts and fixes said optical connector section, wherein said at least two mounts are separately formed from said package,
   wherein said optical fibers protrude to the inside of said package,
   wherein said walls of said positioning structure directly contact side faces of said mounts,
   wherein each of said tips of said optical fibers being arranged so as to oppose one of said light-emitting face of said optical elements and a light-receiving face of said optical elements,
   wherein said positioning structure positions said mounts at predetermined positions so that said light-emitting face or said light-receiving face opposes at least one of said tips of said optical fibers, and
   wherein the positions of said at least two mounts differ in the longitudinal direction of said optical fibers.

2. The optical module according to claim 1, wherein said positioning structure comprises mount positioning protrusions which protrude inwardly in said package.

3. The optical module according to claim 2, wherein said mount positioning protrusions protrude inwardly from inner walls of said package.

4. The optical module according to claim 1, further comprising a positioning stand positioning said protruding portions of said optical fibers.

5. The optical module according to claim 4, wherein said positioning structure comprises a portion of said positioning stand which is in positioning contact with at least one mount of said at least two mounts.

6. The optical module according to claim 5, wherein said portion of said positioning stand comprises a side of said positioning stand.

7. The optical module according to claim 1, wherein said positioning structure comprises:
   a mount positioning protrusion protruding inwardly in said package and in contact with at least one of said at least two mounts; and
   a portion of a positioning stand having said optical fibers and in contact with at least one mount of said at least two mounts.

8. The optical module according to claim 1, wherein said walls comprises:
   a first wall which is formed so as to position at least one of said mounts in a longitudinal direction of said optical fibers; and
   a second wall which is formed so as to position at least one of said mounts in a direction at generally a right angle to the longitudinal direction of said optical fibers.

9. The optical module according to claim 1, wherein at least one of said mounts is positioned by said positioning structure such that the respective light-emitting or light-receiving element is longitudinally aligned in with the protruding portion of one of the optical fibers.

10. The optical module according to claim 1, wherein at least one of said mounts is positioned by said positioning structure such that the respective light-emitting or light-receiving element is positioned at an angle to a longitudinal direction of the protruding portion of one of the optical fibers.

11. The optical module according to claim 1, wherein at least one wall of said walls of said positioning structure is does not protrude inwardly in the package.

12. The optical module according to claim 1, wherein a wall of said walls comprises an inner wall of said package.

13. An optical module comprising:
   a package having first and second optical fibers;
   an optical connector section capable of operatively connecting the first and second optical fibers to an outside optical connector;
   a light-emitting element;
   a light-receiving element;
   a first mount within the package and having the light-emitting element;
   a second mount within the package and having the light-receiving element; and
   a plurality of positioning structures each having walls in contact with the first and second mounts and positioning the first and second mounts such that the light-emitting element is operatively aligned with the first optical fiber and the light-receiving element is operatively aligned with the second optical fiber, wherein the first mount and the second mount are separately formed from the package, and wherein at least one of the positioning structures is an integral part of the package.

* * * * *